United States Patent
Cheung et al.

(10) Patent No.: US 7,848,507 B2
(45) Date of Patent: Dec. 7, 2010

(54) METHOD AND APPARATUS FOR COMPOSITIONAL CONTROL OF END-TO-END MEDIA IN IP NETWORKS

(75) Inventors: Eric Cheung, New York, NY (US); Pamela Zave, Chatham, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 301 days.

(21) Appl. No.: 11/323,131

(22) Filed: Dec. 30, 2005

(65) Prior Publication Data

US 2007/0058558 A1 Mar. 15, 2007

Related U.S. Application Data

(60) Provisional application No. 60/702,375, filed on Jul. 25, 2005, provisional application No. 60/702,374, filed on Jul. 25, 2005.

(51) Int. Cl.
*H04M 7/00* (2006.01)
(52) U.S. Cl. .................. 379/221.11; 370/352; 370/353; 370/354; 370/355; 370/356; 379/142.15; 379/201.01; 379/221.08; 379/221.09; 455/414.1; 709/202; 709/225; 709/226; 709/228; 709/229
(58) Field of Classification Search .............. 379/88.04, 379/142.12, 142.15, 156–158, 165, 201.01, 379/207.1, 207.11, 208.01–217.01, 221.08, 379/221.09, 221.11, 357.04; 370/351–365; 455/414.1; 709/201–203, 225–226, 228–229
See application file for complete search history.

(56) References Cited

U.S. PATENT DOCUMENTS

| | | | | | |
|---|---|---|---|---|---|
| 5,404,396 | A | * | 4/1995 | Brennan | 379/201.05 |
| 5,461,669 | A | * | 10/1995 | Vilain | 379/350 |
| 5,920,618 | A | * | 7/1999 | Fleischer et al. | 379/221.09 |
| 5,999,610 | A | * | 12/1999 | Lin et al. | 379/207.02 |
| 6,453,161 | B1 | * | 9/2002 | Touati et al. | 455/433 |
| 6,535,596 | B1 | * | 3/2003 | Frey et al. | 379/201.01 |
| 6,615,042 | B1 | * | 9/2003 | Britt et al. | 455/433 |
| 6,647,108 | B1 | * | 11/2003 | Wurster et al. | 379/215.01 |
| 6,744,855 | B1 | * | 6/2004 | Hintzen et al. | 379/32.01 |
| 6,744,872 | B2 | * | 6/2004 | Sylvie | 379/207.02 |
| 6,822,942 | B1 | | 11/2004 | Jackson | |
| 6,826,275 | B1 | | 11/2004 | Jackson | |
| 6,888,937 | B1 | * | 5/2005 | Kurapati | 379/265.02 |

(Continued)

FOREIGN PATENT DOCUMENTS

WO WO2005/025180 3/2005

OTHER PUBLICATIONS

Office Action from CA 2,552,330, May 13, 2009, consists of 6 pages.

*Primary Examiner*—Hemant Patel

(57) ABSTRACT

A method and apparatus for controlling end-to-end media on packet networks such as Voice over Internet Protocol (VoIP) and Service over Internet Protocol (SoIP) networks are disclosed. The present method provides an algorithm to be run by channel terminations such that the media channel is controlled by compositional actions. For example, the servers that terminate the media channel are able to respond on behalf of an endpoint in order to effect the appropriate compositional action. The present method also enables each direction of a bi-directional media channel to be controlled independent of the media channel in the opposite direction.

20 Claims, 14 Drawing Sheets

U.S. PATENT DOCUMENTS

| | | | |
|---|---|---|---|
| 7,080,153 B2* | 7/2006 | Monteiro et al. | 709/231 |
| 7,123,608 B1* | 10/2006 | Scott et al. | 370/353 |
| 7,136,651 B2* | 11/2006 | Kalavade | 455/445 |
| 7,206,582 B2* | 4/2007 | Tom et al. | 455/445 |
| 2002/0026515 A1* | 2/2002 | Michielsens et al. | 709/227 |
| 2002/0067818 A1* | 6/2002 | Barathan et al. | 379/219 |
| 2003/0053448 A1* | 3/2003 | Craig et al. | 370/353 |
| 2003/0108172 A1* | 6/2003 | Petty et al. | 379/142.08 |
| 2004/0066916 A1* | 4/2004 | Brown et al. | 379/88.01 |
| 2005/0060411 A1* | 3/2005 | Coulombe et al. | 709/227 |
| 2005/0076108 A1* | 4/2005 | Li et al. | 709/223 |
| 2005/0243981 A1* | 11/2005 | Creamer et al. | 379/88.22 |
| 2005/0249195 A1* | 11/2005 | Simpson | 370/352 |
| 2006/0171378 A1* | 8/2006 | Harris et al. | 370/352 |
| 2007/0133773 A1* | 6/2007 | Da Palma et al. | 379/201.01 |

* cited by examiner

200

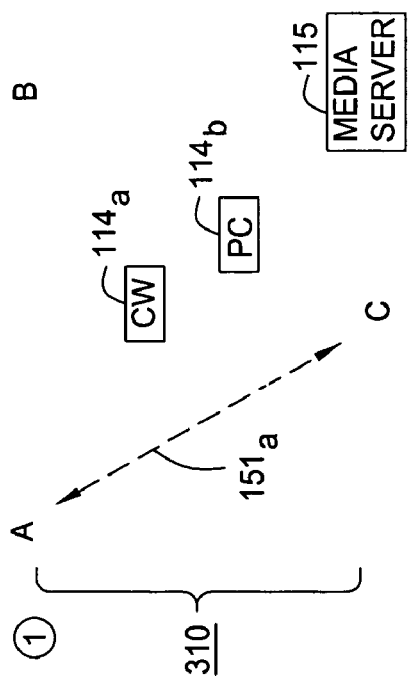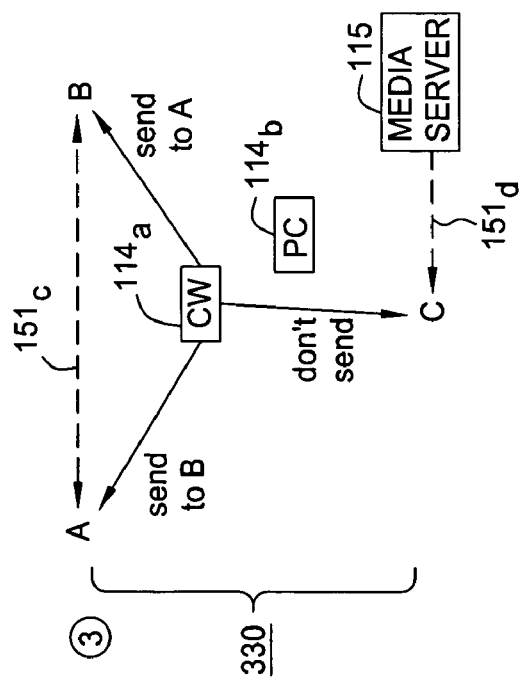
FIG. 3
300

400

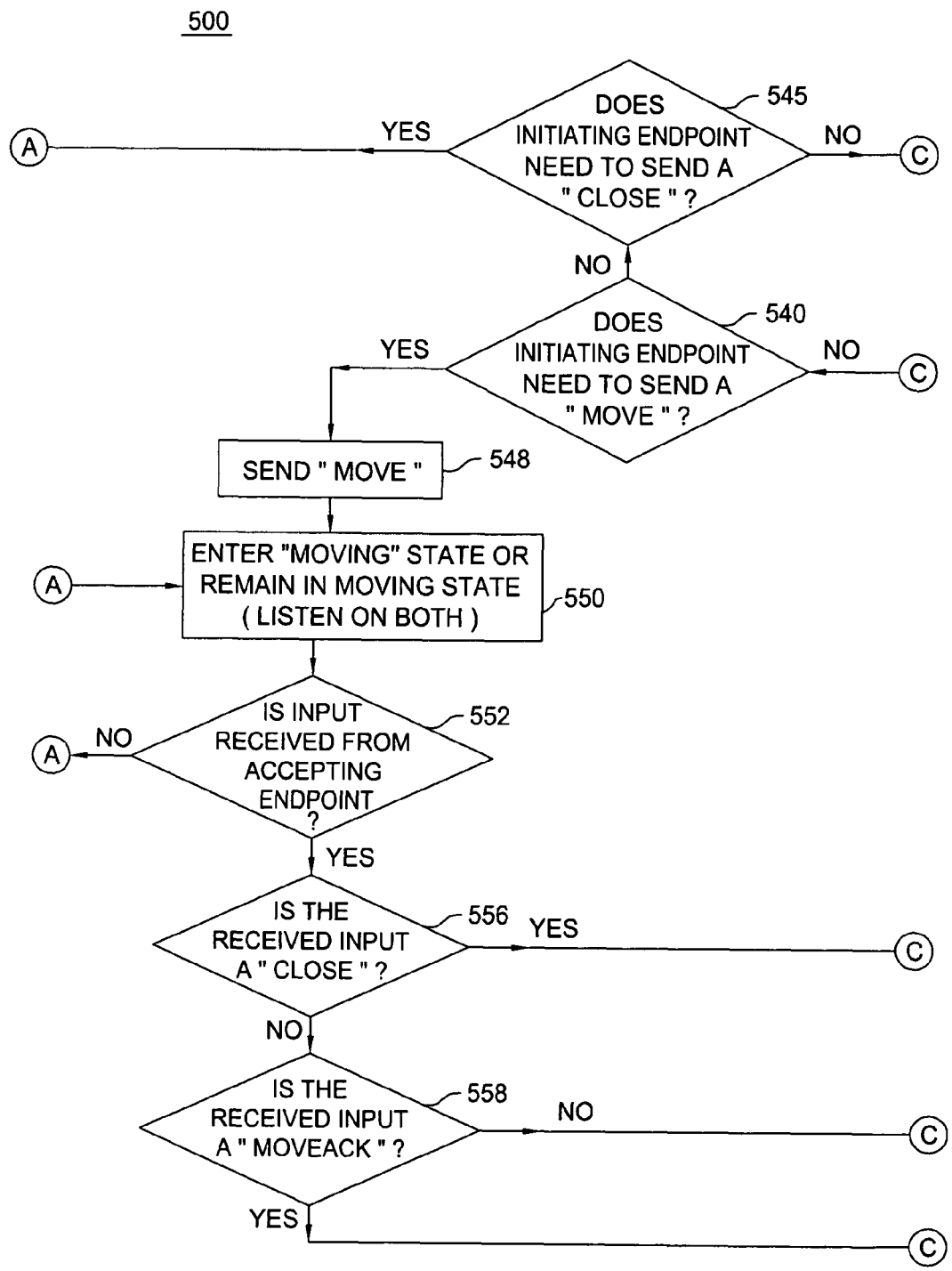
FIG. 5

800

METHOD AND APPARATUS FOR COMPOSITIONAL CONTROL OF END-TO-END MEDIA IN IP NETWORKS

This application claims the benefit of U.S. Provisional Application No. 60/702,375 filed on Jul. 25, 2005, and U.S. Provisional Application No. 60/702,374 filed on Jul. 25, 2005, which are both herein incorporated by reference.

The present invention relates generally to communication networks and, more particularly, to a method for controlling end-to-end media when services are provided on packet networks such as Voice over Internet Protocol (VoIP) and Service over Internet Protocol (SoIP) networks.

BACKGROUND OF THE INVENTION

The Internet has emerged as a critical communication infrastructure, carrying traffic for a wide range of important applications. Internet services such as VoIP and SoIP services are becoming ubiquitous and more and more businesses and consumers are relying on their Internet connections for all of their communications needs. For example, customers use the Internet based infrastructure for video, voice and data transmission applications. The services are provided through application servers located in the IP network. The servers influence the end-to-end signaling to modify it for their purpose and gain control over the media channel. However, when multiple servers have jurisdiction over the same media channel and each server is changing the end-to-end signaling independently, the resulting state of the media channel may become chaotic and may result in abnormal effect on the media channel.

Therefore, there is a need for a method that provides compositional control of end-to-end media channels in an IP network.

SUMMARY OF THE INVENTION

In one embodiment, the present invention discloses a method and apparatus for compositional control of end-to-end media channels in IP networks such as the Voice over Internet Protocol (VoIP) and Service over Internet Protocol (SoIP) networks. For example, the customer subscribes to services and accesses multiple features provided on multiple servers in a core network, e.g., an IP/MPLS network. The present invention provides an algorithm to be run by a plurality of endpoints and channel terminations such that the media channel is controlled by compositional actions of the multiple servers. For example, the servers that terminate the media channel are able to respond on behalf of an endpoint in order to effect the appropriate compositional action. Furthermore, the present invention also enables each direction of a bi-directional media channel to be controlled independent of the media channel in the opposite direction.

BRIEF DESCRIPTION OF THE DRAWINGS

The teaching of the present invention can be readily understood by considering the following detailed description in conjunction with the accompanying drawings, in which:

FIG. 3 provides a plurality of simplified snapshot views of communications among a plurality of customers;

To facilitate understanding, identical reference numerals have been used, where possible, to designate identical elements that are common to the figures.

DETAILED DESCRIPTION

The present invention broadly discloses a method and apparatus for compositional control of end-to-end media in packet networks such as Voice over Internet Protocol (VoIP) and Service over Internet Protocol (SoIP) networks. Although the present invention is discussed below in the context of VoIP and SoIP networks, the present invention is not so limited. Namely, the present invention can be applied in other networks where services are provided using multiple application servers such as the traditional telephone networks, cellular networks, etc.

Figure 1:
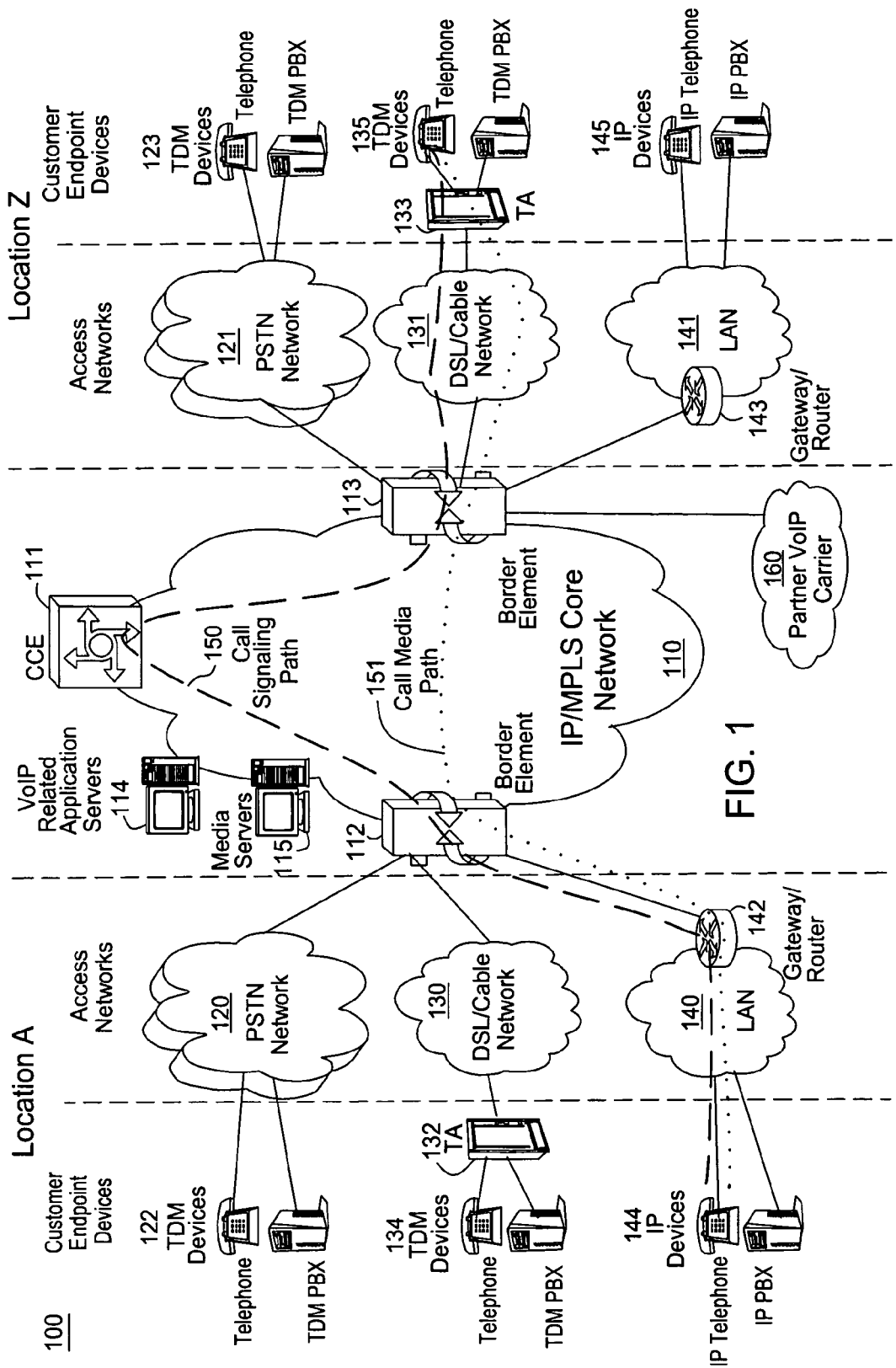
FIG. 1 illustrates an exemplary network related to the present invention.

To better understand the present invention, FIG. 1 illustrates an example network 100, e.g., a packet network such as a VoIP network related to the present invention. Exemplary packet networks include Internet protocol (IP) networks, Asynchronous Transfer Mode (ATM) networks, frame-relay networks, and the like. An IP network is broadly defined as a network that uses Internet Protocol to exchange data packets. Thus, a VoIP network or a SoIP (Service over Internet Protocol) network is considered an IP network. It should noted that a SoIP network is broadly capable of supporting media channels that provide data such as voice, video, music, images, text or any combinations of the preceding.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted as limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such as the Border Elements (BEs) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that requires certain service specific features, e.g. call waiting, translation of an E.164 voice network address into an IP address, etc. The CCE forwards the signaling towards the application servers and receives responses. The application server remains in the signaling path unless it has no mid-call function. Although FIG. 1 shows few servers and a CCE, those skilled in the art realize, a call may involve many application servers and multiple call control elements.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup-signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a back-to-back user agent. If BE 113 needs to be involved in completing the call, CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the called party accepts the call at location Z, a call acknowledgement signaling message, such as a SIP 200 OK response message if SIP is used, is sent in the reverse direction back to the CCE 111. After the CCE 111 receives the call acknowledgement message, it will then send a call acknowledgement-signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. FIG. 1 shows an example of a call with the signaling path and the media path being different. That is because the exemplary call that has been setup between the two endpoints doesn't need the CCE to remain in the media path in this particular instance. In other examples, a call may be setup using multiple CCEs and the CCEs may remain in the signaling path.

Media Servers (MS) 115 are special servers that typically handle and terminate media streams, and to provide services such as announcements, bridges, transcoding, and Interactive Voice Response (IVR) messages for VoIP service applications. The media servers also interact with customers for media session management to accomplish tasks such as process requests.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

The above network is described to provide an illustrative environment in which packets are transported and services are provided on networks such as VoIP and SoIP networks. Although the above network is illustrated using a SIP protocol, any protocol such as SS7, Distributed Feature Compositional (DFC) protocol and the like may be used. Consumers and businesses are continuing to rely on various Internet services provided on multiple application servers in an IP network. For example, customers may use the Internet based infrastructure for video, voice and data transmission applications. Often, the services are provided through multiple application servers located in the IP network. Each server may influence the end-to-end signaling to modify the signaling for its own purpose and to gain control over the media channel. However, when multiple servers have jurisdiction over the same media channel and each server is changing the end-to-end signaling independently, the resulting state of the media channel may become chaotic and may result in abnormal effect on the media channel.

In one embodiment, the current invention discloses a method and apparatus for compositional control of end-to-end media channels in IP networks such as Voice over Internet Protocol (VoIP) and Service over Internet Protocol (SoIP)

networks. The customer subscribes to services and accesses multiple features provided on multiple servers in the core network, e.g., an IP/MPLS network. The present invention provides an algorithm to be run by application servers such that the media channel is controlled by compositional actions of the multiple application servers. In one embodiment, the servers that terminate the media channel are able to respond on behalf of an endpoint in order to effect the appropriate compositional action. In one embodiment, the present invention also enables each direction of a bi-directional media channel to be controlled independent of the media channel in the opposite direction. In order to clearly illustrate the teachings of the current invention, the following terminologies and networking concepts will first be described:

IP media channel;
Feature; and
Compositional media control.

IP media channel refers to a communications channel established through the use of an IP signaling protocol. The protocol creates an agreement by which media endpoints know where and in what format to transmit media. The protocol also tells the endpoints from where and in what format they can expect to receive the media. Until the agreement changes, the endpoints transmit media directly to each other, without further use of the signaling protocol.

Feature refers to a program module that modifies or enhances a basic communication service. The current invention deals with features that operate on media channels, e.g. features that switch, conference (mix), replicate, mute, open, or close media channels. In telecommunications, these features may include features that employ the voice channel for signaling (through announcements, prompts, touch tones, voice recognition, etc.), because all such features have to switch user voice channels to and from voice-processing servers. It should be noted that features can reside anywhere in an IP network. Features that reside at the edge, e.g., as part of their endpoints, may use their IP signaling protocol in the role of endpoints to make the necessary changes in media transmission. Features that reside in the network core, on the other hand, must be inserted into the relevant end-to-end signaling paths. Once inserted in the signaling path, the features that reside in the network core participate in the end-to-end signaling as "application servers", "proxy servers", or "back-to back user agents", to influence the signaling for their purposes. However, the problem of compositional media control as defined below arises from the fact that multiple features, in endpoints and in the network, can have jurisdiction over the same media channel and be attempting to change it independently and concurrently. The result can be chaotic and it is not a rational composition of the intentions of the various features.

Compositional media control refers to control of a media channel based on rational composition of the intentions of various features such that the correct behavior is produced regardless of the number of active features. In one embodiment of the current invention, a media control protocol designed for compositional behavior such as Distributed Feature Composition (DFC) is used. However, the present invention can be implemented using other protocols such as SIP.

Figure 2:
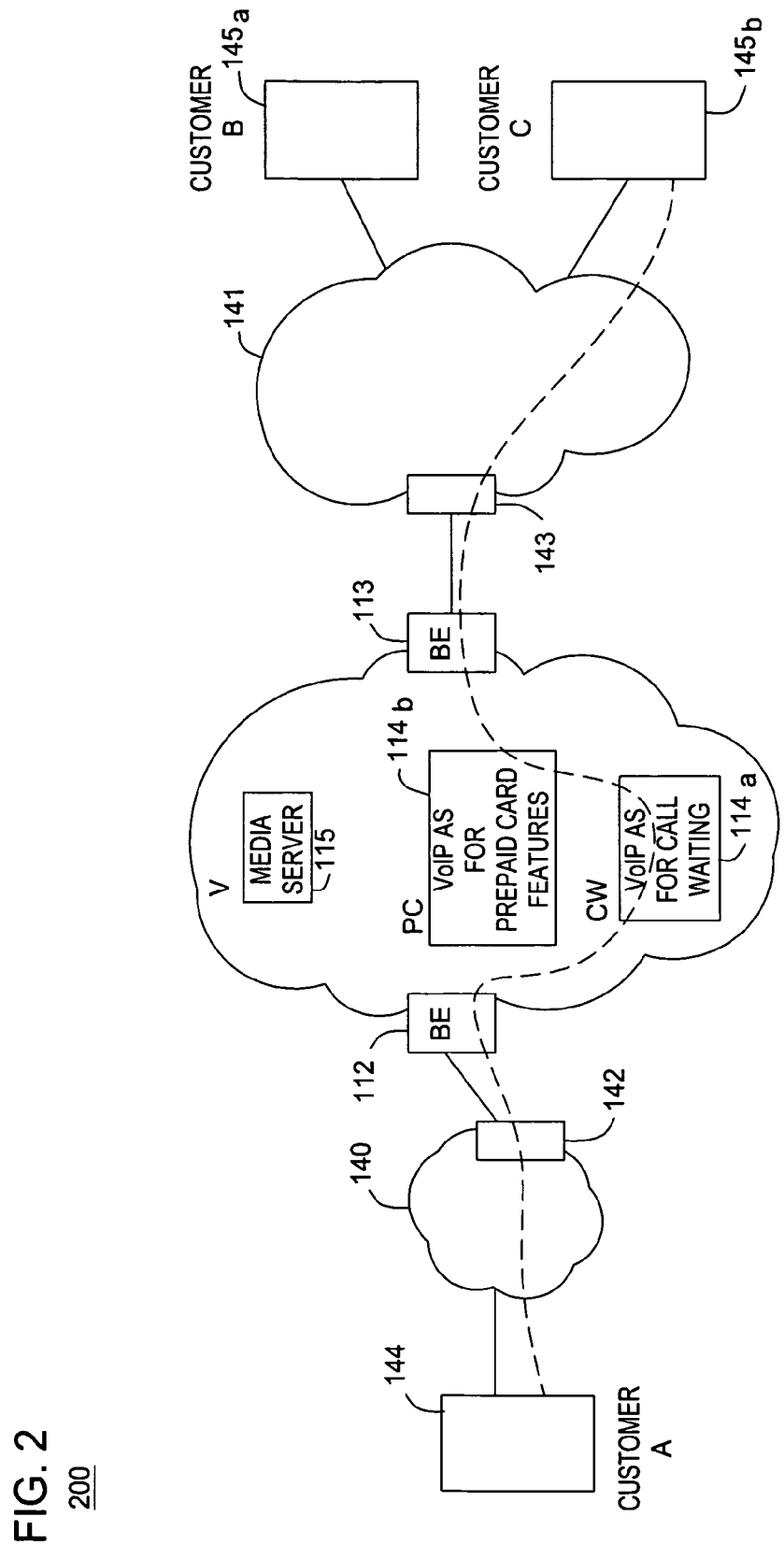
FIG. 2 provides an illustration of an exemplary telecommunication network.

FIG. 2 provides an illustration of a telecommunication network 200 which may benefit from compositional media control. To illustrate, customer "A" is using the IP device 144 to access IP services such as VoIP and SoIP services. IP device 144 is connected to the access network 140. The access network 140 contains a gateway router 142. The gateway router is connected to a core network, e.g., an IP/MPLS core network 110 through a border element 112. In this example, VoIP application servers 114a and 114b are deployed in the IP/MPLS core network. The service provider utilizes the application server 114a to provide call waiting features, and application server 114b to provide prepaid calling card features. Similarly, other subscribers may use the IP devices 145a and 145b to access the IP services. For example, customer "B" is accessing services via IP device 145a and customer "C" is accessing services via IP device 145b. The IP devices 145a and 145b are connected to the access network 141. The access network 141 contains a gateway router 143. The gateway router is connected to the IP/MPLS core network 110 through a border element 113. Note that only the network elements needed for describing the present invention are included. Other network elements needed for VoIP or SoIP services are omitted for simplicity.

FIG. 3 illustrates a plurality of simplified snapshot views of the communications among customers "A", "B" and "C" as described above in FIG. 2. Snapshot 310 arose because customer A (a subscriber of call waiting) was talking to customer B. Then customer C (a user of a prepaid card) contacted the prepaid-card server 114b and used the prepaid-card to call customer A. Customer A received notification of the incoming call and switched to talk to customer C leaving customer B on hold. Customer A is then in communications with customer C using media path 151a.

Snapshot 320 shows what happens when the funds of the prepaid-card become exhausted. A timer goes off in the prepaid-card server 114b and the server sends signals to put customer A on hold and to connect customer C to the media server 115. The media server 115 has voice-processing capability, V, which serves as the user interface to the prepaid-card server 114b. The media server 115 prompts customer C to supply additional funds using media path 151b.

Snapshot 330 shows what happens when the next event is that customer A uses call waiting to switch back to customer B using media path 151c. The call-waiting server 114a sends normal signals, but they have the abnormal effect of leaving the media server 115 without voice input from customer C on media path 151d. Note that the media path 151d has input only in the direction of customer C.

Snapshot 340 shows what happens when the next event is that the media server 115 completes authentication of the funds from customer C (presumably supplied before customer C was cut off) and reconnects customer C with customer A on media path 151f. Again, the prepaid-card server 114b sends normal signals but they have abnormal effect. The abnormal effect in this case is that a media connection between customers "A" and "C" is created. Customer "A" neither requested nor expected the media connection to be created and the conversation between customer "A" and "B" to be interrupted.

The problem illustrated in FIG. 3 occurs because each server is sending commands to the endpoints without knowledge of the other server, even though the behavior of the endpoints and media paths should be a composition of the actions of the two servers 114a and 114b. For example, customer C should be connected to customer A if and only if customer A has used call waiting to switch to customer C, and the prepaid-card server 114b has a reserve of funds from customer C. One goal of the present invention is to provide a method that produces compositional media control with the correct behavior at all times, regardless of how many features are active.

The current invention provides a compositional method for control of end-to-end media regardless of how many features are active in the IP networks. The method can be used to program any feature functionality and works for all interleaving of events. This is important because, as shown in the example above, features often reconfigure media pathways in response to external events such as timeouts that are not synchronized with events of the media protocol. Furthermore, the programmer's interface is declarative and simple for implementation.

Figure 4:
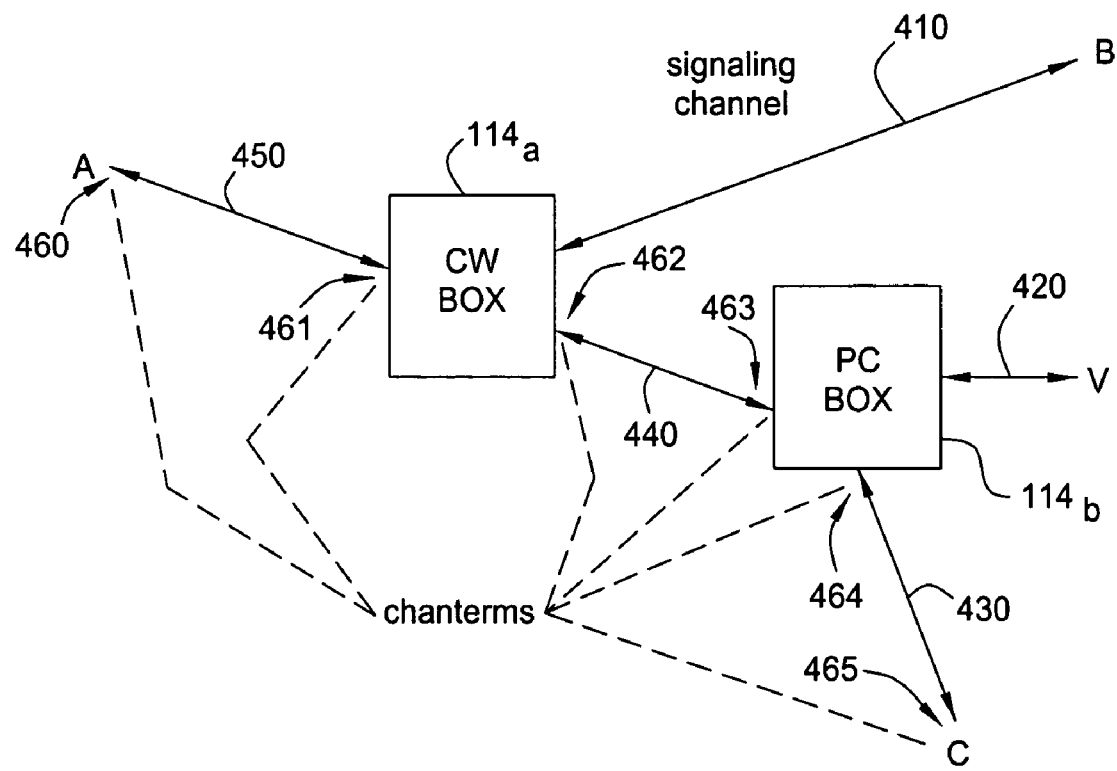
FIG. 4 illustrates an architecture for a compositional medial control solution to the problem as illustrated in FIG. 3.

FIG. 4 illustrates an architecture 400 for a compositional media control solution to the problem as illustrated in FIG. 3. In order to describe the architecture clearly, the following DFC terminologies are provided below:

Box;
Signaling channel;
Channel termination (chanterm); and
Tunnel.

A "box" refers to an autonomous feature module within the network. In a one-level architecture, a server containing multiple feature modules is viewed as a single box representing the server or as a collection of boxes each representing a feature, but not both. The signals of the media-control protocol travel on signaling channels are as defined below. For example, FIG. 4 includes the call waiting feature box 114a and the prepaid card feature box 114b.

Signaling channel refers to a two-way transmission channels for sending and receiving signaling protocols that operate on a First In First Out (FIFO) basis. Signaling channels connect boxes and media endpoints, so that a signaling path between two media endpoints may consist of many signaling channels and boxes. The signaling channels 410, 420, 430, 440 and 450 are used for connecting boxes and media endpoints as shown in FIG. 4.

Note that both the call waiting box 114a and the prepaid card box 114b are in the signaling path between customers A and C and each box sees some of the signals of the other box. Signaling paths are assembled in accordance with the overall goal of the communication service. If the functions of two feature boxes both apply to a media transmission between the two endpoints, then both feature boxes must be in the signaling path between the endpoints.

In addition, if the functions of a feature box have priority over the functions of other feature boxes in determining the media behavior observable at a particular endpoint, the feature box associated with the higher priority function must be closer to the endpoint than the other feature boxes in the signaling path between the two endpoints. FIG. 4 illustrates the significance of this point. With respect to the media behavior observable by customer A, the call waiting feature box has priority over the prepaid card feature box. While the call waiting feature box is connecting between customers A and B, no action of the prepaid card feature box should affect customer A.

Each signaling channel carries signals for at most one media channel. This means that every request to open a media channel, the "open" signal, travels on a distinct signaling channel. The "open" signal is the initiating signal of the protocol. As shown in FIG. 4, each box can be an endpoint for multiple signaling channels. The end of a signaling channel at a box or media endpoint is called a channel termination, or "chanterm" for short. Each chanterm 460, 461, 462, 463, 464 and 465 is said to be "initiating" if it sends an "open" signal. A chanterm is said to be "accepting" if it receives an "open" signal. As stated above, every signaling channel carries exactly one "open" and a chanterm cannot be both "initiating" and "accepting".

Within the scope of each box, all the box's chanterms have unique identifiers called tunnels. To guarantee uniqueness, there are some global rules ensuring that the set of tunnels identifying a box's initiating chanterms is distinct from the set of tunnels identifying a box's accepting chanterms. Then, to complete the guarantee of uniqueness, a box chooses unique tunnels for its initiating chanterms. Even if a box is involved in a race between incoming and outgoing "open" signals, the two signals will have independent signaling channels, chanterms, and tunnels.

In order to clearly illustrate the teachings of the current invention, some simplification assumptions are first made to reduce the complexity of the problem. The present invention then provides the methods for removing the simplification assumptions. The simplification assumptions are:

All network components and endpoints act promptly such that there are no prolonged delays;
Each media channel is a separate individual, rather than a part of some larger bundle, connection, or transaction;
"Status" or "progress" signals associated with media channels are not considered;
There is only one medium and each media endpoint can transmit and receive this medium;
Each media channel is two-way (bi-directional);
There is only one data format (codec) for the medium and each media endpoint can transmit and receive this data format; and
"Muting" of media channels is not considered.

In the architecture illustrated in FIG. 4, there is only point-to-point (unicast) media transmission. Boxes can only open, close, and switch media channels (which includes "holding" a media channel whose endpoint is not currently connected to another endpoint). If the simplifying assumptions made earlier are removed, boxes can also mute. If a box requires mixing, replication, or other processing of media streams, it redirects the streams to a media-processing center.

When a media endpoint wishes to open a media channel, it issues an "open" signal with a media address field. This field gives an address to which media should be sent. As soon as the endpoint sends the signal, it begins listening for media at the specified address.

If a media endpoint receives an "open" signal and agrees to participate in the requested channel, its interface box responds with "oack". The "oack" signal also has a media address field indicating where media should be sent. As soon as the endpoint sends the signal, it begins listening for media at this address. If the endpoint refuses to participate, it responds with "close" instead of "oack".

If an endpoint later wishes to change how the media of the channel is sent to it, it sends the signal "move" with a new media address. In this phase the endpoint must be accepting media at both the old and new addresses.

When the other endpoint receives the "move" signal, it acknowledges it with the signal "moveack" and begins to use the new address for transmission. As soon as the moving endpoint receives "moveack", it can stop accepting media at the old address.

There is also a distinguished address value "noAddr". If an endpoint receives "noAddr" in a media address field it does not transmit media, regardless of the state of the protocol. If a new media address received by an endpoint is redundant—it is the same as the recipient's existing value—then it is simply ignored.

Either endpoint may close a media channel by issuing a "close" signal. It is acknowledged with a "closeack" signal. On receiving a "closeack" signal, an endpoint can stop listening for media transmission.

The customer subscribes to services and accesses multiple features provided on multiple servers in the IP/MPLS network. The current invention provides a protocol (algorithm)

to be run by endpoints and channel terminations such that the media channel is controlled by compositional actions of the multiple servers.

Figure 5:
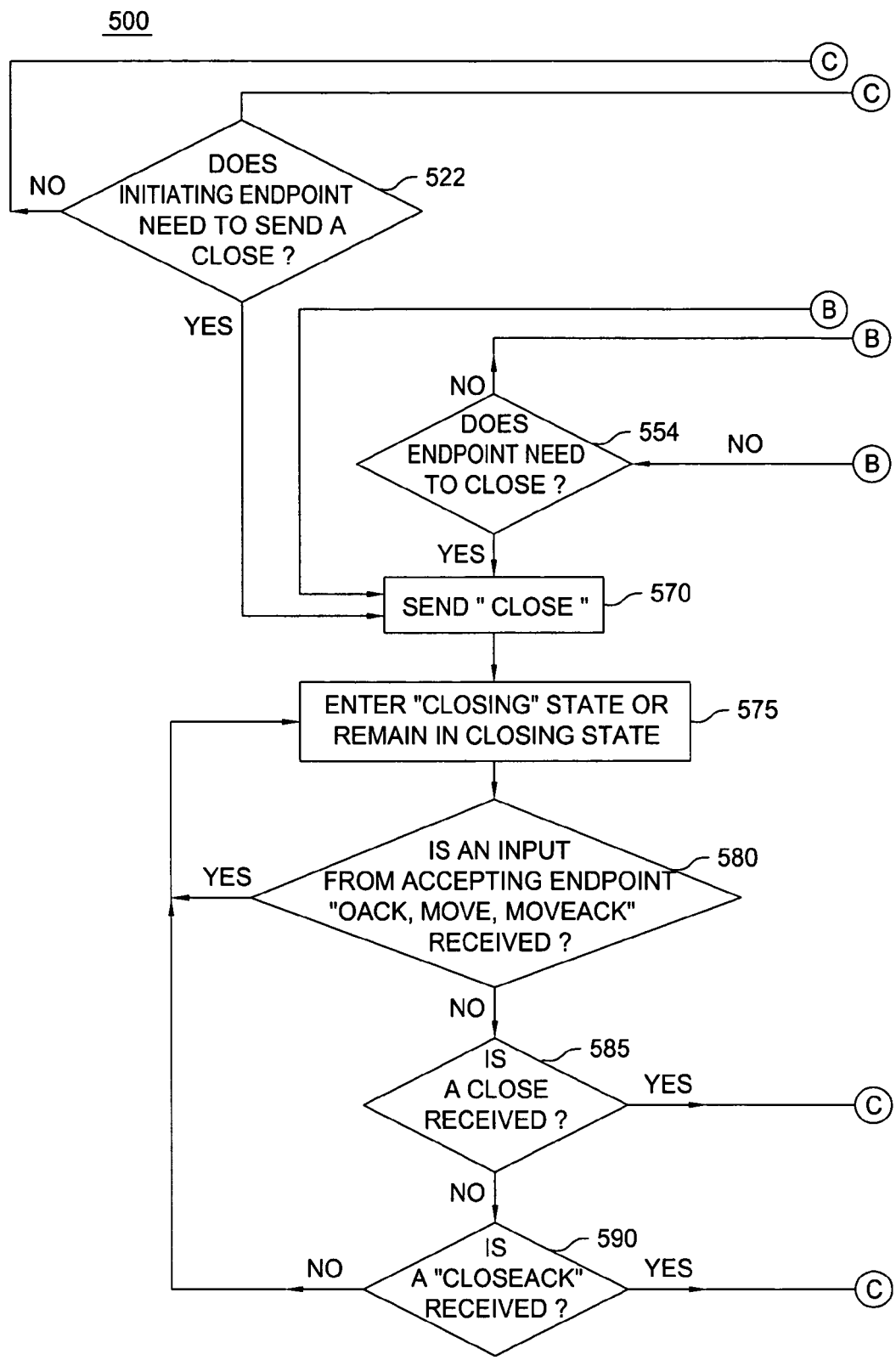
FIG. 5 illustrates a flowchart of the method for controlling end-to-end media channel for an endpoint initiating a media channel request.
Figure 5:
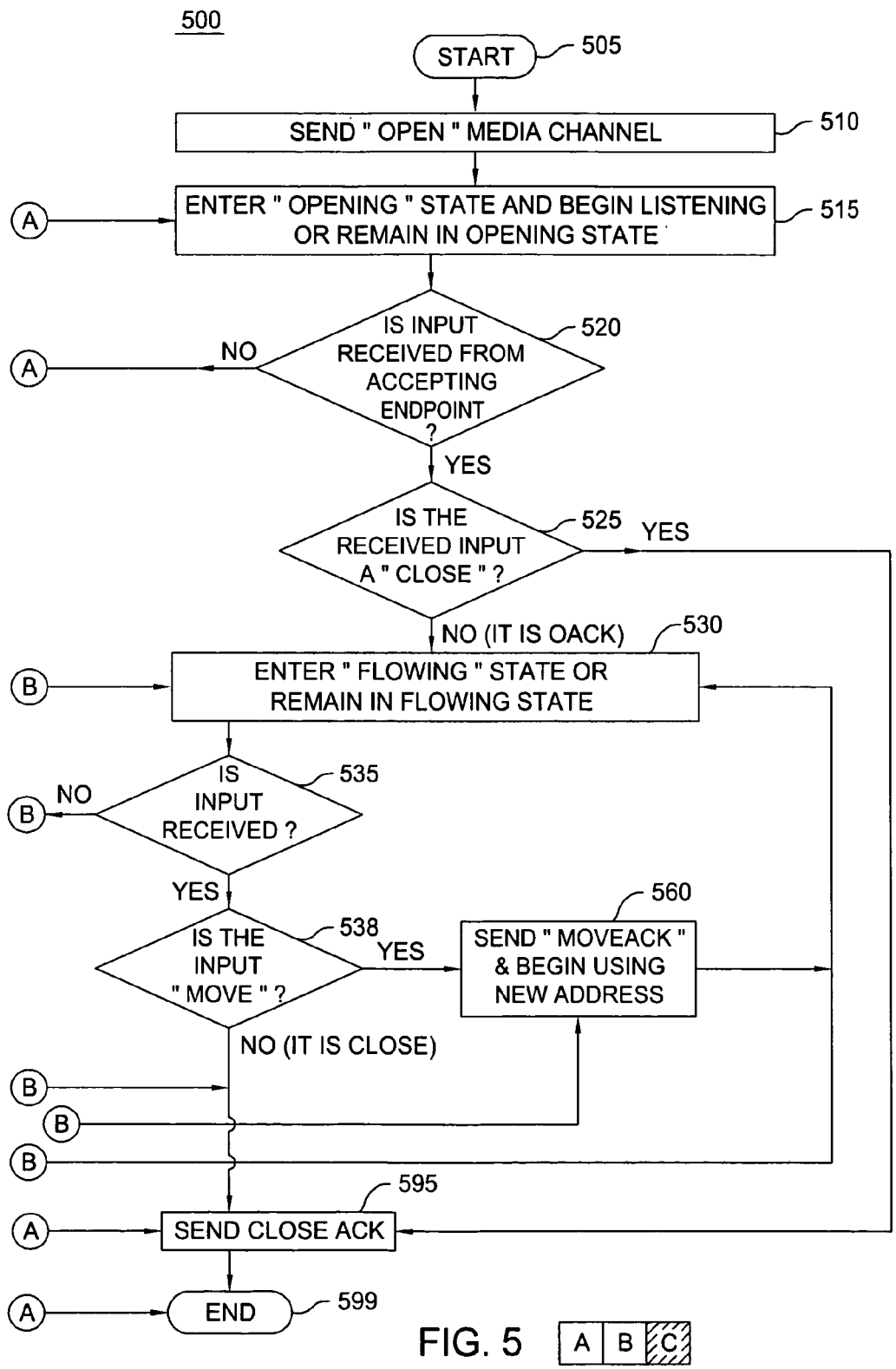

FIG. 5 illustrates a flowchart of a method 500 for controlling end-to-end media channel for an endpoint initiating a media channel request.

Method 500 starts in step 505 and proceeds to step 510. In step 510, method 500 enables a media endpoint that wishes to initiate a media channel to send an "open" signal. The "open" signal includes an address field that provides the location to which media should be sent. The method then proceeds to step 515 and enters the "opening" state.

In step 515, method 500 enters the "opening" state. The "initiating" endpoint listens for media at the specified address while it is in the "opening" state. The method then proceeds to step 520 to determine whether an input is received from the accepting endpoint.

In step 520, method 500 determines whether or not an input is received from the accepting endpoint. For example, the accepting endpoint may send an acknowledgement "oack" signal or may send a "close" request. If no response is received, the method proceeds to step 522 to determine whether or not to send a "close" request. If a response is received, the method then proceeds to step 525 to determine the type of response.

In step 522, method 500 determines whether or not the initiating endpoint needs to send a "close" request. If the initiating endpoint needs to send a "close", the method proceeds to step 570 to send a "close" and enters the closing state. Otherwise, the method returns to step 515 and remains in the opening state.

In step 525, method 500 determines whether or not the received input is a "close" request. If the response is a "close", the method proceeds to step 595 to acknowledge the "close" request and to end processing of the current request in step 599. Otherwise, the method proceeds to step 530 to enter the "flowing" state.

In step 530, method 500 enters the "flowing" state or remains in the "flowing" state. While in the flowing state, data begins to flow at the requested address until either another request is received, e.g., move, close, etc. or the initiating endpoint decides to initiate another request such as a "close". The method then proceeds to step 535 to determine whether or not an input is received from the accepting endpoint.

In step 535, method 500 determines whether or not an input is received from the accepting endpoint. If an input is received, the method proceeds to step 538, otherwise it proceeds to step 540 to determine whether or not the initiating endpoint wants to send another request.

In step 538, method 500 determines if the received input from the accepting endpoint is a request for a "move". If the request is a "move", the method proceeds to step 560 to acknowledge the move request. Otherwise, the request must be for a "close" and the method proceeds to step 595 to acknowledge the "close" request.

In step 540, method 500 determines whether or not the initiating endpoint needs to send a request for a "move". If a "move" request needs to be initiated, the method proceeds to step 548 to send the move. Otherwise, the method proceeds to step 545 to determine whether or not a "close" request needs to be sent.

In step 545, method 500 determines whether or not a "close" request needs to be sent. If a "close" request needs to be sent by the initiating endpoint, the method proceeds to step 570 to send the close and enter the "closing" state. Otherwise, method 500 returns to step 530 and remains in the flowing state.

In step 548, method 500 sends the "move" request and proceeds to step 550 to enter the "moving" state. In the "moving" state, the endpoint is listening to both the old and the new address.

In step 550, method 500 enters the moving state or remains in the moving state. Note that the endpoint accepts media at both the new and old addresses until an acknowledgement is received from the other endpoint. When the acknowledgement is received, the method proceeds back to the flowing state and uses only the new address. The method proceeds to step 552 to determine whether or not the accepting endpoint responded.

In step 552, method 500 determines whether or not an input is received from the accepting endpoint. If an input is received, it proceeds to step 556 to determine the type of input. Otherwise, it proceeds to step 554 to evaluate whether or not the initiating endpoint needs to send a "close" request.

In step 554, method 500 determines whether or not the initiating endpoint needs to send a "close" request. If it needs to send a "close", the method proceeds to step 570 to send the close and enters the closing state. Otherwise, the method proceeds to 550 and remains in the moving state.

In step 556, method 500 determines whether or not the received input is for a "close". If the request is for a "close", method 500 proceeds to step 595 to acknowledge the "close" request and ends processing of the current request. Otherwise, the method proceeds to step 558.

In step 558, method 500 determines whether or not the received input is an acknowledgement for a move request sent by the initiating endpoint. If the input is a move acknowledgement (moveack), the method proceeds to step 530 to enter the flowing state and to use the new address. Otherwise, the input is a "move" and the method proceeds to step 560 to send "moveack" and enter the flowing state.

In step 560, method 500 sends a "moveack" in response to a received "move" request and begins using the new address for transmission. When the endpoint that sent the "move" receives the "moveack", it stops accepting media at the old address.

In step 570, method 500 sends a "close" to the accepting endpoint and proceeds to step 575 to enter the "closing" state.

In step 575, method 500 enters the closing state or remains in the closing state. The method then proceeds to step 580 to determine whether or not an "oack", "move" or "moveack" input is received from the accepting endpoint.

In step 580, the method determines whether or not an "oack", "move" or "moveack" input is received from the accepting endpoint. If an input of the type "oack", "move" or "moveack" is received, the method proceeds to step 575 to remain in the closing state. Otherwise, the method proceeds to step 585 to determine whether or not a "close" request is received.

In step 585, method 500 determines whether or not a "close" is received. If a "close" request is received, the method proceeds to step 595 to acknowledge the request. Otherwise, the method proceeds to step 590.

In step 590, method 500 determines whether or not an acknowledgement for a close, "closeack", is received. If the "closeack" is received, the method proceeds to step 599 to end processing the current request and ends listening for media transmission. Otherwise, it proceeds to step 575 to remain in the closing state.

In step 595, method 500 sends an acknowledgement for a "close" request, i.e., "closeack". The method then proceeds to step 599 to end processing the current request.

Figure 6:
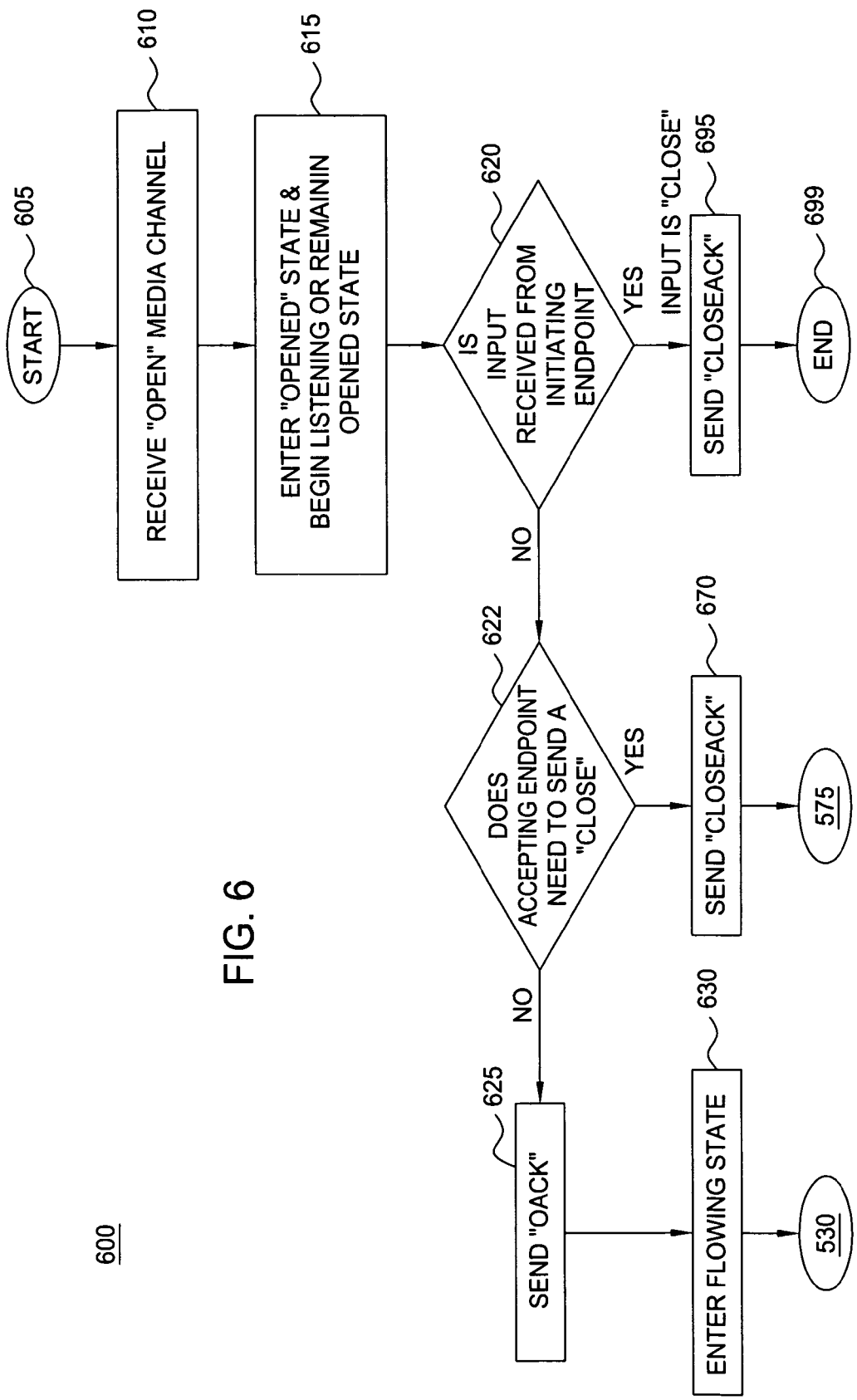
FIG. 6 illustrates a flowchart of the method for controlling end-to-end media channel for an endpoint accepting a media channel request.

FIG. 6 illustrates a flowchart of a method 600 for controlling end-to-end media channel for an endpoint accepting a media channel request.

Method 600 starts in step 605 and proceeds to step 610. In step 610, method 600 enables a media endpoint to receive an "open" signal from an initiating endpoint. The received "open" signal includes an address field that provides the location to which media should be transmitted. The method then proceeds to step 615 and enters the "opened" state.

In step 615, method 600 enters the "opened" state. The accepting endpoint listens for media at the specified address while it is in the "opened" state. The method then proceeds to step 620 to determine whether an input is received from the initiating endpoint.

In step 620, method 600 determines whether or not an input is received from the initiating endpoint. For example, the initiating endpoint may send a "close" request. If an input is received, the method then proceeds to step 695 to acknowledge the "close" request. Otherwise, the method proceeds to step 622.

In step 622, method 600 determines whether or not the accepting endpoint needs to send a "close" request. If a "close" is to be sent, the method proceeds to step 670. Otherwise, the method proceeds to step 625.

In step 625, method 600 acknowledges the received request by sending "oack" and proceeds to step 630 to enter the "flowing" state. In the flowing state, the method continues to listen for an input. It also continues on evaluating on whether or not to send a request for a "move" or "close." Namely, once it enters the flowing state, the accepting endpoint has the same steps as the initiating endpoint as described in steps 530, 535, 538, 540, 545, 548, 550, 552, 554, 556, 558 and 560 in FIG. 5. Thus, the reader is referred to FIG. 5 for a description of these steps.

In step 670, method 600 sends a "close" request and enters the "closing" state. Similarly, once in a closing state, the accepting endpoint has the same protocol as the initiating endpoint as described in steps 575, 580, 585 and 590 in FIG. 5. Thus, the reader is referred to FIG. 5 for a description of these steps.

In step 695, method 600 sends a "closeack" in response to a receive "close." Note that this step is identical to step 595 describing the method for an initiating endpoint. The method then ends in step 699.

The full protocol (code) written in a Spin model checker language called Promela is provided in Appendix A for both the initiating and accepting endpoints.

Figure 7:
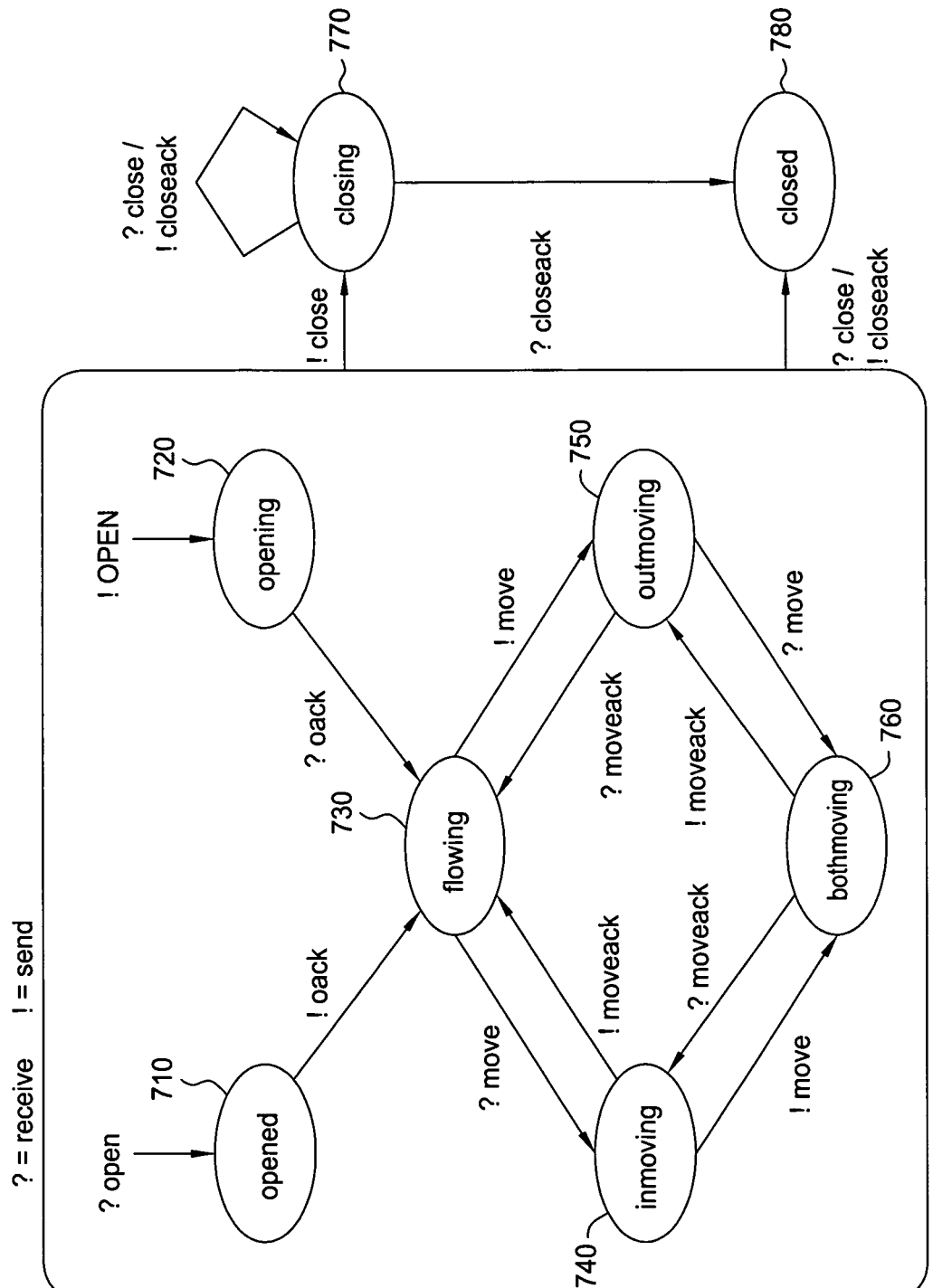
FIG. 7 illustrates the states of a channel termination.

In the compositional architecture illustrated in FIG. 4, every chanterm as well as every endpoint obeys this protocol. However, a chanterm has more possible states because it cannot always acknowledge a "move" signal immediately. A channel termination has no defined state until it has received or sent an "open" signal. FIG. 7 illustrates the eight states of a "chanterm". The states and the transition among the states are described below. Appendix B provides the codes for a chanterm written in Promela.

The chanterm may receive or send an "open" signal. If a chanterm receives the "open" signal it enters the opened state 710 and its interface responds with an "oack". The "oack" signal includes a media address field indicating where media should be sent. It then proceeds to the "flowing" state 730.

If a chanterm sends the "open", then it enters the "opening" state 720. Once it is in the "opening" state, it begins listening for an acknowledgement. When it receives the "oack", it proceeds to the "flowing" state 730.

A chanterm in the flowing state may either send or receive a "move". If it receives a "move", it proceeds to the "inmoving" state 740 and sends an "moveack". If it sends a "move", it proceeds to the "outmoving" state 750 and begins waiting for the "moveack" while listening at both the old and new addresses. When it receives the "moveack", it proceeds to the flowing state 730 and uses the new address.

A chanterm in the "inmoving" state 740 may also need to initiate a "move". In that case, it sends the "move" and proceeds to the "bothmoving" state 760. If it receives an acknowledgement, "moveack" for the "move" it initiated, the chanterm then returns back to the "inmoving" state. While in the "bothmoving" state if it sends the "moveack" for the received "move", the chanterm proceeds to the "outmoving" state 750. The outmoving state is entered when the chanterm has sent a "move" and the "move" has not been acknowledged.

A chanterm may initiate or receive a "close" while in any state. If it initiates a "close", it proceeds to the closing state 770. While in the closing state 770, it waits for the acknowledgement for the "close" that it has sent. When it receives the "closeack", it then proceeds to the closed state 780. If the chanterm receives a "close", it proceeds to the "closed" state 780 and sends an acknowledgement, "closeack".

If a chanterm in the closing state 770 received a "close", it responds with "closeack" and remains in the closing state until a response is received for its own "close" request.

The above protocol has several properties that make the core solution easier than it would otherwise be. First, note that the "move" signals traveling in the two directions are completely independent of each other. It is never a problem if both ends of a signaling channel are sending "move" signals at the same time. Also note that, in a particular direction, a chanterm cannot send a second "move" signal" until it has received a "moveack" signal acknowledging a move signal it has already sent. This one-move-at-a-time rule limits the number of protocol states. The fact that a "close" signal both refuses an "open" and closes a channel simplifies feature programming, without lose of information. In addition, the use of "closeack" signals makes it clear when the job of a signaling channel is completely finished, so its identifiers and other resources can be recycled. Protocols that do not provide this closure cause many problems.

In the compositional architecture illustrated in FIG. 4, the signaling paths between the two endpoints are assembled in accordance with the overall goal of the communications service. The feature boxes are located between the two endpoints and the feature box with the higher priority function from the perspective of an endpoint is located closest to that endpoint. The feature boxes have multiple channel terminations and use the above protocol. The two endpoints also follow the protocol for the endpoints.

The current invention enables a feature box located between two endpoints to initiate requests and to respond to requests on behalf of an endpoint such that the media channel is controlled in order to effect the appropriate compositional action of the multiple features and endpoints.

Figure 8:
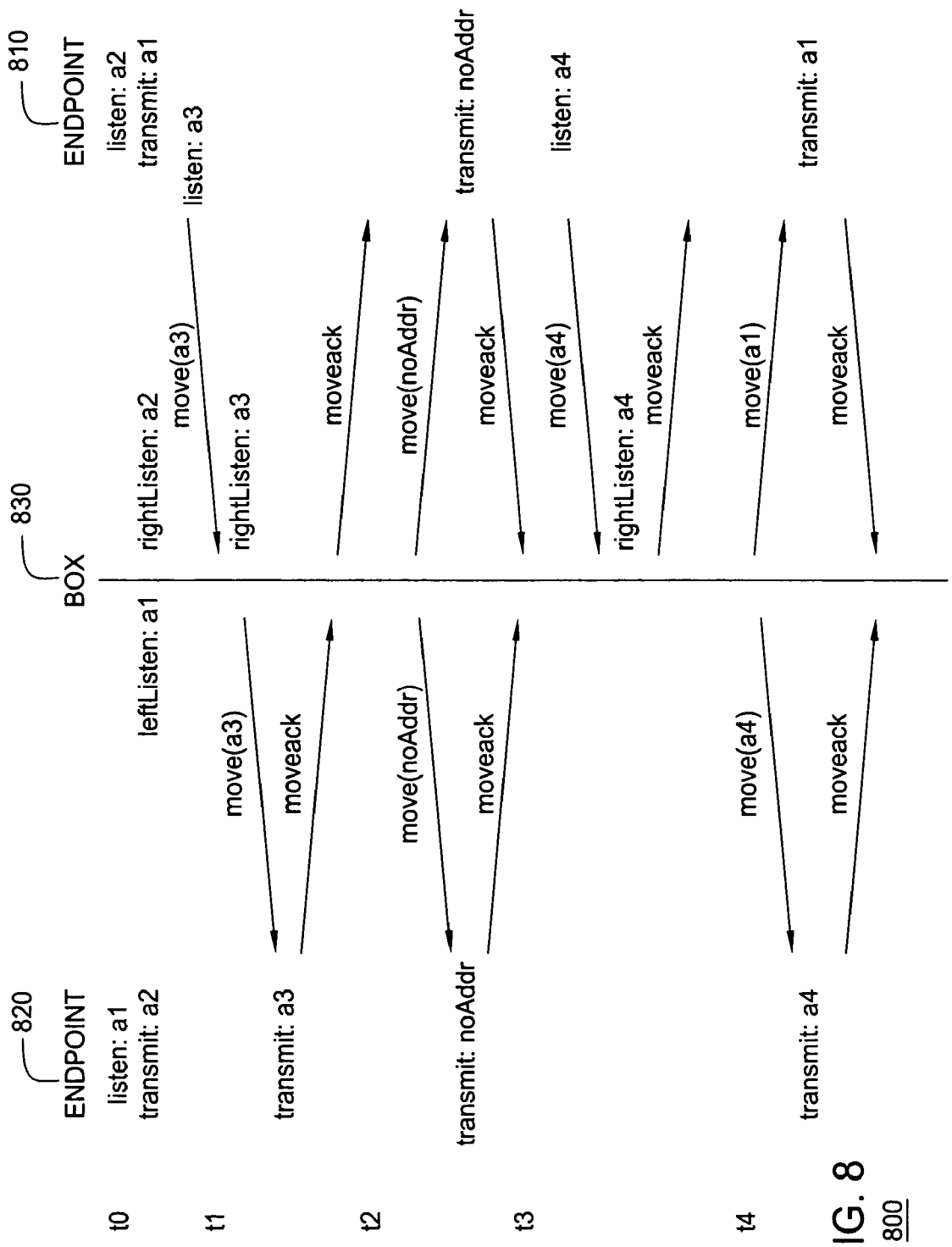
FIG. 8 illustrates the basic behavior of a feature box.

FIG. 8 illustrates the basic behavior of a feature box. This behavior has the virtue of composing correctly with the behavior of other feature boxes. The figure is a message-sequence chart showing the use of the above protocol by two endpoints and a feature box.

For example, each endpoint has two address variables: "listen" and "transmit". "Listen" contains the address where the endpoint is currently listening for media, whereas "transmit" contains the address to which the endpoint is currently transmitting media.

At the top of the chart (time t0) a media flow between the two endpoints 810 and 820 has already been established.

Because the box 830 wishes to allow media flow between the two endpoints, it has behaved transparently, and is continuing to do so. Note that the box recorded the listening address of its left chanterm when it passed through the box in an "open" or "oack" signal, and did the same for its right chanterm.

At time t1 the right endpoint 810 uses the protocol to change its listening address from a2 to a3. The box 830 behaves transparently except for recording the new address.

At time t2 the box 830 decides to put both endpoints on hold, thereby interrupting the flow of media between them. It does this by sending "move(noAddr)" to both endpoints 810 and 820. The box absorbs both "moveack" signals that it receives in return, because the box is the originator of the "move" that they are acknowledging. Hence, at time t2, the present invention enables the box to initiate the "move" and to absorb the "moveack" from both endpoints.

At time t3 the right endpoint 810 again uses the protocol to change its listening address. Because the box still has its right endpoint on hold and connected to nothing, it absorbs the move signal, while recording the new address. It also generates the "moveack" signal that the right endpoint is expecting.

At time t4 the box decides to reconnect the two endpoints. It does this by sending each one a move signal with its most recent recorded address for the other endpoint. The box absorbs both "moveack" signals that it receives in return, because the box is the originator of the move that they are acknowledging. Thus, by having all the boxes behaving in this manner, the overall behavior of the system is made to be the correct composition of their intentions, regardless of how many boxes lie in the signaling path between the two endpoints.

A feature box is programmed to perform the above functions. The programmer's interface can be implemented in many ways. One embodiment of the invention for programming the box interface is provided below.

In one embodiment, instead of manipulating chanterms directly, a programmer manipulates "slots". At any time, a slot is either vacant or is filled by one chanterm. All the different chanterms that fill a slot over time are equivalent in the sense that they all have the same purpose within the box. For example, the box in FIG. 8 might have a slot 1 for the current chanterm leading to the endpoint 820 on its left, and a slot 2 for the current chanterm leading to the endpoint 810 on its right. A programmer decides what he or she wants to do with a slot at any time in accordance with a purpose for the slot. Namely, the slot corresponds to a purpose; and the purpose determines how the slot is manipulated. The programmer maintains the proper relationship between chanterms and slots by assigning each "open" signal that it receives to a vacant slot. The programmer enables this by calling the method:

Public void handleOpenSignal
(Signal signal, int slot)

with the "open" signal of the chanterm and the slot it wishes to use. The method:

public boolean vacantSlot (int slot)

can be used to determine whether a slot is empty.

Slots are convenient abstractions for chanterms. For example, the box in FIG. 8 can use slot 1 for its left chanterm regardless of the direction in which the media channel is opened, and therefore regardless of whether the incumbent chanterm is initiating or accepting. It can continue to use slot 1 for this purpose even if the media channel is repeatedly closed and re-opened, so that the slot has a sequence of many incumbent chanterms. A box programmer never initiates a chanterm as the programs supporting slots always perform that function.

A box manipulates a slot by assigning it sequentially to various "links". In one embodiment, there are different types of link for different purposes. For example, in FIG. 8, at time t0 the box has assigned slots1 and 2 to a "flowlink". The purpose of a flowlink is to allow media flow between the endpoints represented by its two slots, provided that the other features in the signaling path cooperate. The flowlink handles receiving and sending of all media signals to and from these slots.

If at the time a flowlink is initialized, its two slots hold chanterms that are in incompatible states, the link does whatever is necessary to make their states consistent. Because of this capability, a box can assign slots to a flowlink at any time, regardless of the states of the chanterms filling them. This is also true of the other three single-slot link types: "openlink", "closelink", and "holdlink", which respectively open, close, and hold the chanterm in their slots. Thus a slot can be alternately put on hold (as at time t2) and connected (as at time t4) by assigning it alternately to a holdlink and a flowlink. The box may make these changes without consulting the states of the slots because the links will do the right thing for the slots in any state.

An example of a Java programming interface for links is provided below. A slot can only be assigned to one link at a time. Moving a slot means removing it from its current link before putting it in a new one.

```
public void enterOpenLink(int slot)
public void enterCloseLink(int slot)
public void enterHoldLink(int slot)
public void enterFlowLink
    (int slot1, int slot2)
public void exitLink(slot)
```

Each enter . . . Link method creates a new link object. After all its slots are removed by "exitLink", a link object is garbage.

The only thing a box program needs to do for media control is to relay other media signals to their links. This is done by invoking the method:

Public void handleMediaSignal (Signal signal)

The implementation of the method finds the appropriate link and passes the signal to the link for processing.

An example that illustrates the programming interface is provided below. First, Java pseudocode for a box that allows transparent media flow for every media channel whose signals are routed through the box is provided below. The code ignores all other functions of the box, including termination. Signals are objects, and the method "typeOfSig" gets their protocol type, which is one of "open", "oack", "move", "moveack", "close", or "closeack".

```
int   s = 1;
while (true)  {
    <receive any media signal>;
    int   type = signal.typeOfSig( );
    if   (type = = OPEN)   {
        box.enterFlowLink(s, s+1);
        box.handleOpenSignal(signal,s);
        s    =  s + 2;
    }
    else box.handleMediaSignal (signal);
```

In each flowlink, the first slot holds an accepting chanterm, and the second slot holds an initiating chanterm that the link will create to continue the signaling path for the media channel. By deciding which slot an open belongs to, the box is adjudicating glare in a way that is appropriate for its own purposes. The following program illustrates the transparent phase of the box in FIG. 8. It is similar to the program above, except that it allows at most one media channel.

```
box.enterFlowLink(1,2);
int  s  =  3;
while  (true) {
        <receive any media signal>;
        int  type  =  signal.typeOfSig( );
        if   (type  = = OPEN)   {
             if   (box.vacantSlot(1)       &&
                  <open comes from left endpoint>)
                  box.handleOpenSignal (signal, 1);
             else if (box.vacantSlot(2)    &&
                  <open comes from right endpoint>)
                  box.handleOpenSignal (Signal, 2);
             else   {
                    box.enterCloseLink(s);
                    box.handleOpenSignal(signal, s++);
             }
        }
        else box.handleMediaSignal(signal);
}
```

The box decides on whether an incoming "open" is redundant (and should therefore be rejected) based on which endpoint it represents and whether or slot for that endpoint is vacant.

For example, the media programming for Click-to-Dial feature box may be performed using the above. First, the box opens a media channel to the subscriber or customer who is using Click-to-Dial. The "open" signal sent by the openlink contains the media address "noAddr". If and when the user endpoint sends "oack", the box attempts to extend the media channel to the called party using a flowlink. The flowlink will ensure that both user and called party endpoints are transmitting to the right media address. The sequence for the Click-to-Dial is as follows:

```
box.enterOpenLink(1);
while (true) {
   <receive any media signal>;
   box.handleMediaSignal(signal);
   if   (<oack received from slot1>)   {
        box.exitLink(1);
        box.enterFlowLink(1,2);
   }
}
```

It is important to realize that programming context is responsible for ensuring that the chanterm in slot 1 is connected somehow to the user, and the chanterm in slot 2 is connected somehow to the called party. For this program to work, its context must also ensure that the box has no accepting chanterms. Note that the box initiated the chanterms to both user and called party.

Box programmers need capabilities for sensing the states of slots, including "vacantSlot" and some implementation of the psuedopredicates used above. These capabilities are not specified or implemented in this invention, because once the implementation of slots and links is understood, extending them to provide sensing capabilities is made known.

This interface is declarative because the programmer simply identifies slots with purposes, and then states how he/she wants the chanterm occupying each slot—if any—to be treated. The implementation does all the work. The implementation is also independent of the states of the chanterms occupying the slots, so the programmer can change his/her declarations at any time.

The present invention can be generalized to implement advanced telecommunication features. The following are some examples:

A feature box that manipulates a primary media channel (perhaps voice) and an optional secondary media channel (perhaps video);

A feature box that manipulates one media channel between two endpoints. The two endpoints might also have any number of other media channels, which are related to the first channel for routing purposes, but are treated transparently by the box;

A feature box that switches media channels in response to a timeout or user command. Two previously unconnected media endpoints must be connected if possible, regardless of their states at the time of the timeout or command;

An unreliable media channel is repeatedly lost and restored; and

The purpose and handling of a media channel are unrelated to its protocol characteristics, for example the direction in which it is initiated.

With the programming interface provided above, the scenarios and advanced features are no harder to program than the simplest cases.

Figure 9:
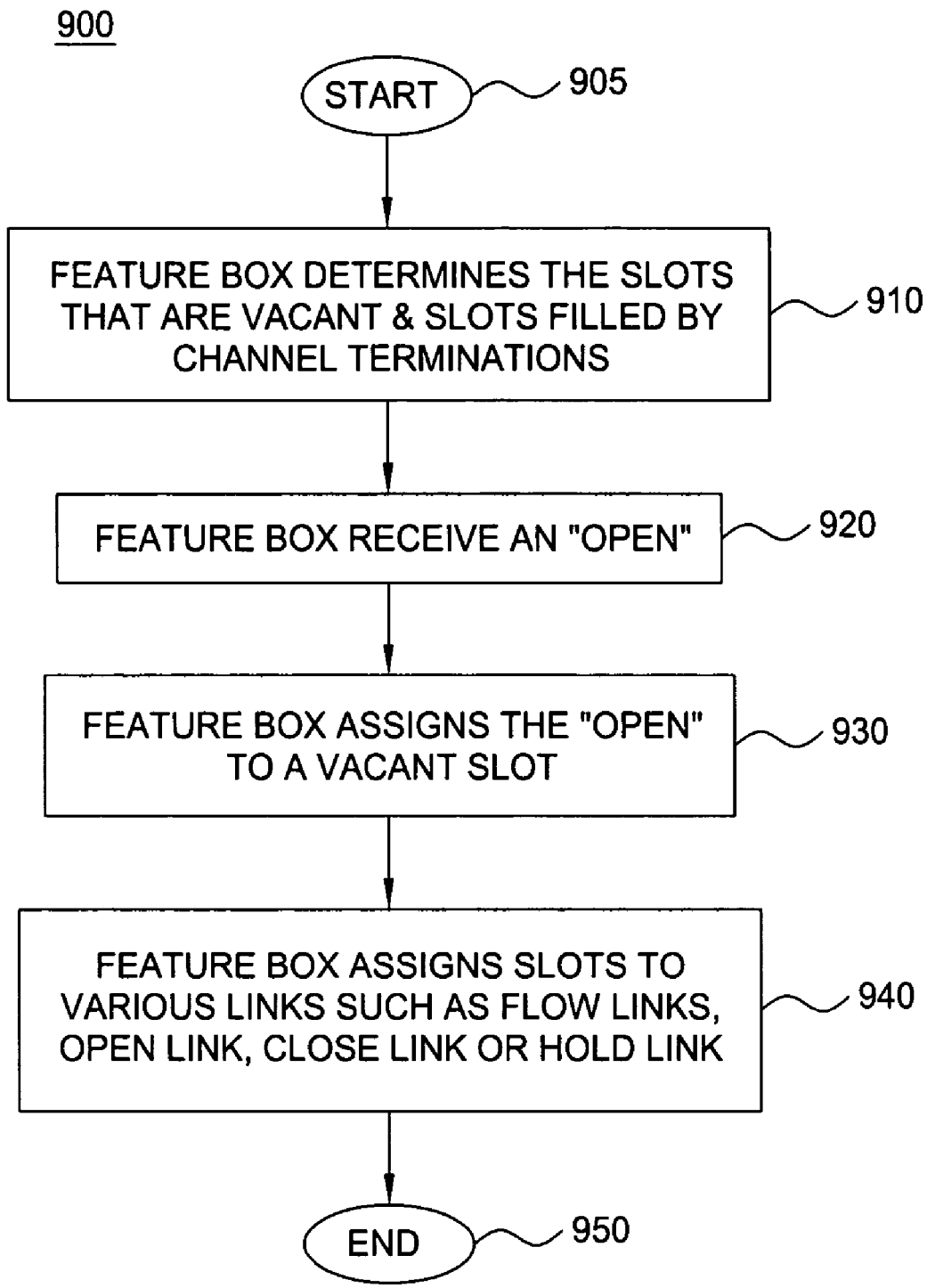
FIG. 9 illustrates a flowchart of a method of the current invention for providing compositional control of an end-to-end media channel.

FIG. 9 illustrates a flowchart of the method 900 of the current invention for providing compositional control of end-to-end media. For example, the network service provider enables the feature boxes with channel terminations to initiate a request and/or to respond to a request for media channel on behalf of an endpoint.

Method 900 begins in step 905 and proceeds to step 910. In step 910, method 900 determines the slots that are vacant and the slots that are filled by a chanterm. Slots are abstractions for chanterms that enable the box to use the chanterm regardless of whether the incumbent chanterm is initiating or accepting.

In step 920, method 900 receives an "open". For example, a box located between two endpoints receives an "open" for media channel directed towards the other endpoint.

In step 930, method 900 assigns the "open" to a vacant slot identified in step 910. The box can use a slot for a chanterm regardless of the direction in which media is opened. Therefore, whether the chanterm is initiating or accepting the "open" is not relevant.

In step 940, method 900 implements the present invention by assigning the slot sequentially to various links. For example, a slot may be assigned to a flowlink, openlink, closelink or holdlink. An assignment of a slot to a flowlink allows media flow between two slots. An assignment of a slot to openlink, closelink and holdlink enable open the chanterm in the slot, close the chanterm in the slot and hold the chanterm in the slot, respectively. Method 900 ends in step 950.

Figure 10:
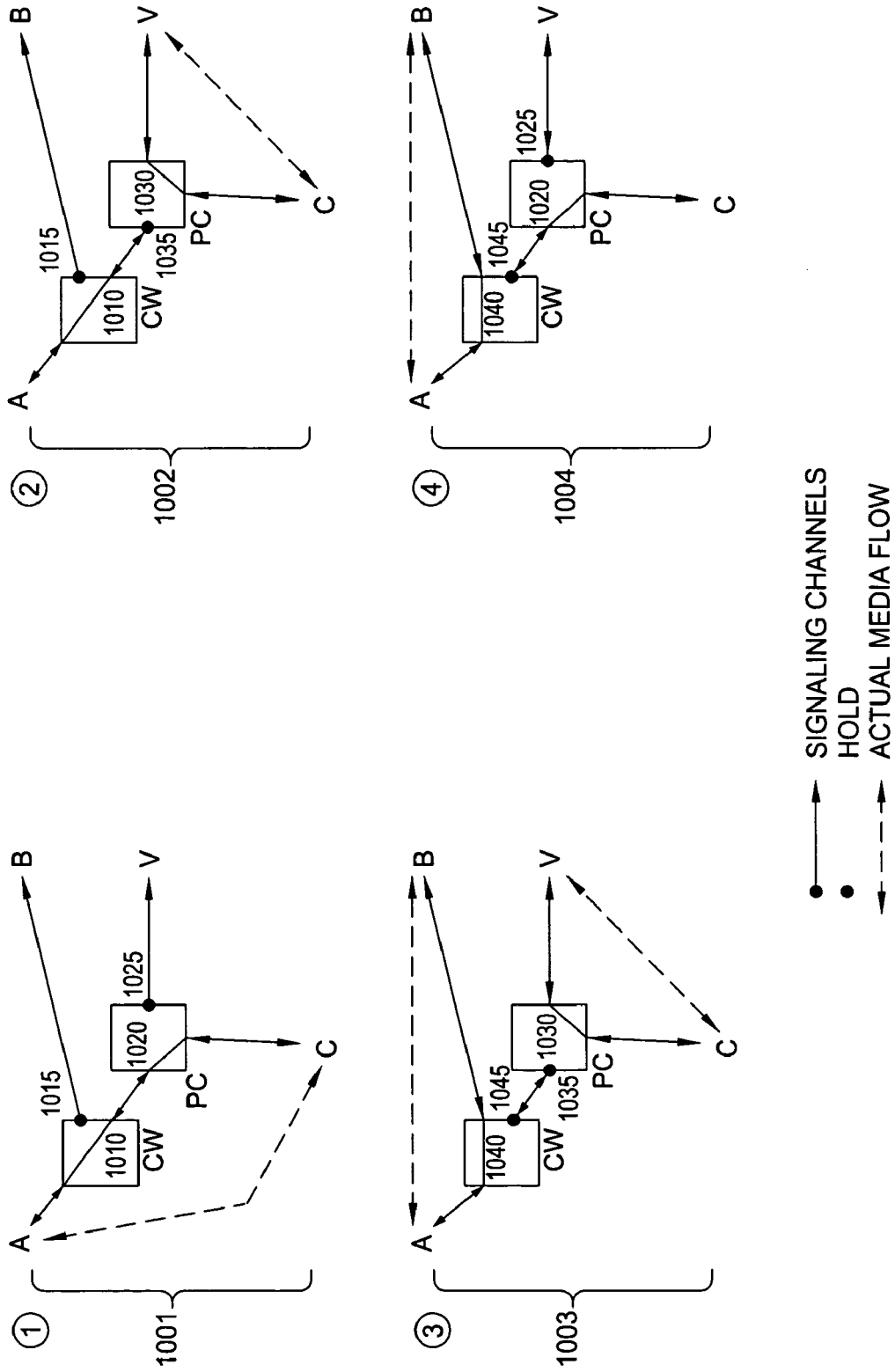
FIG. 10 illustrates how the method of the invention works on the initial example of FIG. 3.

FIG. 10 illustrates how the method works on the initial example of FIG. 3. Again, the four stages (or snapshots) are the same as in FIG. 3. At snapshot 1001, customer A uses Call Waiting to switch back to customer C. In FIG. 10, solid lines connecting two chanterms (e.g., solid lines 1010, 1020, 1030 and 1040) within a box indicate that the box is attempting to provide media flow by assigning the slot to a flowlink. For example, it is representative of the box in FIG. 8 between time t0 and t2 and after time t4. A dot at a chanterm (e.g., 1015, 1025, 1035, and 1045) in a box indicates that the box is preventing a media flow by assigning the slot to a holdlink. For example, it is representative of the box in FIG. 8 between time t2 and t4. Note that there is a media path between two endpoints if and only if there is a continuous signaling path between the endpoints. The scenario shown in FIG. 8 is easy to understand because there are no race conditions—every change occurs in a stable state, in which there are no other ongoing changes. The implementation of this compositional idea may be more complex when it accommodates more boxes and endpoints in every possible state, and every possible interleaving of events.

The method invocation hierarchy among the java classes that may be used to implement the present invention is provided in Appendix C.

There were some simplification assumptions made in describing the present invention as disclosed above. The present invention also provides methods for removing the assumptions one at a time and independently. Those skilled in the art would realize each one of these assumptions might be removed, based on the needs of those implementing the present invention. The methods for removing the following limitations are provided below:

Delay in responses;
Bundled channels;
Progress signals;
Channel descriptors; and
Endpoint descriptors.

Delay in responses refers to a delay in an acknowledgement by an endpoint. An endpoint should always acknowledge a "move" or "close" signal quickly. On the other hand, there should be a long delay before it responds to an "open" signal with an "oack" or "close". For example, some endpoints will not send "oack" until a human user answers a ringing telephone.

Consider the situation in which a vacant slot and a slot in the "flowing" state have just been assigned to a new FlowLink object. The flowlink will attempt to fill the vacant slot by sending an "open". During the long delay that might follow before the "open" is acknowledged, the endpoint associated with the flowing slot will continue to transmit media to the wrong address. This behavior is unacceptable. The flowing slot should be put "on hold" to stop media transmission until a response to the "open" signal arrives.

Bundled channel refers to media channels that are bundled into larger connections. Bundling makes it possible to establish a connection between two users, and then allow the users to add media channels to the ongoing connection as they wish. A signaling channel for a media channel is a tunnel in the signaling channel of the call. The previous solution needs to include internal calls as containers for media control signaling channels.

As described earlier, a box's chanterms are identified by tunnels, which must be unique within the box. Now a chanterm is identified by a tunnel and a call, and the tunnel must only be unique within the call. Thus, the DFC's rule for tunnel uniqueness can be adopted here. A specific slot can only be filled by chanterms of a specific call, so slots become relative to calls as well.

Sometimes an endpoint will attempt to open two media channels at the same time, with the same remote endpoint. Because the various medial tunnels of a call are asynchronous with respect to each other, one open signal will arrive at the remote endpoint first, and the remote endpoint might not know that there is another open signal coming, and that the user should be presented with both offers together.

In addition to the media tunnels, the signaling channel of a call has a tunnel for signals referring to the call as a whole. This signaling channel can be used to synchronize different media channels when necessary, as channel is FIFO overall. For example, to solve the problem above, a signal should be sent through the call tunnel before either open is sent. This call-level signal says that two channel offers are coming.

The program for the solution is modified by converting the "Maps object" to "CallMaps object". The "constructor" and "newinitiator" methods are modified. The DFC rule for tunnel uniqueness is that if the initiator chaterm belongs to the end of the call that placed it (the call is outgoing from that end) then the tunnel is an odd number, and otherwise it is an even number. So the constructor gets this information from the box and uses it to initialize the variable "nextTun". Previously, newInitiator was only pseudocode, and now there is a real implementation of it. In the modified code, a pointer to a "CallMaps" object is used as the unique identifier of a call. In keeping with this dual nature, a local CallMaps variable in the Box object is call, and a local CallMaps variable in a Link object is maps. Depending on how other aspects of a box are programmed, a call might have a different unique identifier. If so, the box must maintain the association between call identifiers and CallMaps objects.

Now every method of the box library with a slot or tunnel argument has an extra argument for the call. Link objects controlling only one slot are scarcely affected, as their Maps object is simply turned into a CallMaps object with the same interface. FlowLink object is affected slightly more, as it now will have two CallMaps pointers instead of one Maps pointer. However, note the effect this has on the "linkReceive" method. A flowlink could be controlling two slots within the same call or two like-numbered slots of different calls. For this reason, linkReceive must check both slot and maps arguments to determine whether the signal it is receiving belongs to its slot1 or its slot2.

A new chanterm is also given a pointer to the CallMaps object. The pointer is playing its role as unique identifier of a call. This is necessary because a chanterm sends signals out on a signaling channel, and now that channel is a tunnel of a particular call. The ChanTerm objects now point to CallMaps objects, while previously ChanTerm objects did not point to Maps objects.

When a DFC call is torn down, all its media-control signaling channels disappear. Let us consider how a box should be programmed to make this transition correctly and efficiently. For purposes of discussion, the box has a flowlink currently controlling "slotU" of "callU" and "slotD" of "callD". There is a state of transition in which callD is torn down while callU stays up. The box should execute a code for removing all references to callD. Then the box removes the flowlink, any other links controlling only chanterms of callD, and any remaining ChanTerm objects of callD.

The fate of the signaling path of which the flowlink was a part depends on what the box does with its other slot. For example the slot may be assigned to a holdlink.

Progress signal refers to media control protocols that include signals for indicating the progress or user status of media channels. Progress signals do not affect media flow directly, but rather support feature and user interface programming.

In DFC there are four status signals: "wait", "accept", "reject", and "none". In there most typical use, wait means that the called party telephone is ringing, accept means that the called party has answered the telephone, reject means that a user has rejected the offered media channel, and none resets the status to unknown. According to the DFC protocol, these signals can be sent by a chanterm whenever media flow is established. Two changes to the previous solution are needed to accommodate these signals.

First, ChanTerm objects must save the current "progress" state of the endpoints they represent, and make it available when needed. This requires a new method "termProgress" and additions to termReceive. Note that the progress state is kept separate from the main control state. Although progress signals usually flow from called party (acceptor) to caller (initiator), connections are not always that simple; for example, two callers might be connected by a conferencing feature. The progress state of an endpoint that has sent an "open" signal is deemed to be accepted, as the endpoint has demonstrated commitment to the communication. The initial progress state of an opening chanterm is unknown, as set by the method termReceive.

The second change is made in the FlowLink code, which must transmit progress signals when necessary. Recall that progress signals can only be sent when a slot is in one of the four states in which media flow is allowed: "flowing", "inmoving", "outmoving", "bothmoving". In the new FlowLink code, these states are defined as "anyFlowing" states.

The new code divides the problem into two cases: (1) If a slot receives a progress signal and the other slot is anyFlowing, forward the signal to the other slot and (2) If the flowlink is being initialized, or if a slot becomes anyFlowing when the other slot is already anyFlowing, call the new method matchProgress.

The method "matchProgress" does nothing unless both slots are "anyFlowing". If they are, it obtains the progress states of both slots and sends each in a signal to the other slot. This simple method relies on the fact that progress signals are idempotent—redundant or unnecessary ones are simply ignored.

Also, a new kind of link, the "waitlink" is added to the library. A waitlink is exactly like a "holdlink" except that if it receives an open and goes to the flowing state, it sends a wait signal as well. A waitlink might be used in a Call Waiting feature box to hold the voice channel of a new incoming call for the feature's subscriber. Because of the wait signal, a caller at an ordinary telephone will hear ringback while he is waiting for the subscriber to answer.

Channel descriptor refers to a descriptor that specifies a medium and a direction for the requested channel. The previous solution assumed that there is only one medium, and that all channels are two-way. To remove these simplifying assumptions, we need to add channel descriptors to open signals. An endpoint that receives an open signal should reply with oack only if it can participate in a channel with the specified medium and direction. Any media application will support a set of discrete media such as voice, video, music (high-quality sound), text, and images. The application chooses its media and encodes the media choices as integers. The basic concept is that all endpoints of a medium are interchangeable, in the sense that each one can receive from any other. A media channel can be two-way or one-way. This information is important to an endpoint responding to an open signal. For example, a video camera can send video and not receive it, while a video display can receive video and not send it.

If a media channel is one-way, it is necessary to specify which way. This is tricky because the direction must be specified relative to something fixed. The direction of the open signal is not fixed for a media channel as a whole, because a feature box might receive open signals from two different endpoints, and establish a media channel between two endpoints. The solution is to understand that a direction is relative to a signaling channel, rather than to an entire signaling path composed of many channels. Directions are encoded as both, send, and receive. A two-channel has direction both. A one-way channel has direction send or receive. The direction send in an open signal means "send media in the same direction as the travel of this signal". The direction receive in an open signal means "send media in the opposite direction from the travel of this signal". If a one-way media channel is controlled by a signaling path in which there are open signals in both directions, then some the opens will contain send and some will contain receive.

For example, in a signaling path controlling a one-way video channel, the purpose of the signaling path is to connect a video camera and a video display. The hub of the signaling path is a "video switch" feature box, which connects different cameras and displays at different times. The video application is designed so that all devices call in to the switch when they are ready to communicate. The open from the camera specifies direction send because the camera will send video. The open from the display specifies direction receive because the display will receive video.

Most of the code changes arise from the fact that openlinks and flowlinks must now have channel descriptors. These links sometime generate open signals, and when they do, they must know what channel descriptors to put in the signals. The link gets a channel descriptor in its constructor arguments, which it stores in private variables "medium" and "direction". When the "attemptToOpenAndHold" method generates an open signal, it copies the channel descriptor in the signal from these variables.

The question "what is a channel direction relative to?" arises anew for a flowlink, because either slot of a flowlink can be occupied at different times by initiating and accepting chanterms. The choice can be arbitrary, provided that it is fixed for each flowlink, e.g., choose the relationship between slot1 and slot2 of the flowlink. The direction "send" in a flowlink means "send from slot1 to slot2". The direction "receive" in a flowlink means "send from slot2 to slot1". The direction from slot1 to slot2 is the same as the direction in which this open will travel.

The new code for openlinks and flowlinks guarantees that the chanterms they initiate have the right channel descriptors. The box program is responsible for assigning accepting chanterms to slots in openlinks and flowlinks only if their channel descriptors are compatible.

Endpoint descriptor refers to a descriptor that has two fields that replaces the media address. In the previous solution, an endpoint is described only by its "mediaAddress". A more elaborate "endpoint descriptor" can be used to remove the final simplifying assumptions. Each "open", "oack", and "move" signal carries an endpoint descriptor.

An endpoint descriptor consists the two fields: A string called "addrAndCodecs" replacing the "mediaAddress" field and a Boolean tag called "flow".

The "addrAndCodecs" field includes both the media address and a list of data formats (codecs) that can be received and understood at that address. The codecs are in priority order, and the sender is expected to use the highest-priority codec that it can. The list of codecs must include a "least common denominator" codec that every source of the medium can generate. The address and codec list are packaged together in a string because the code does not examine them.

These rules allow some flexibility with respect to codecs without compromising the principle that an endpoint descriptor describes a single endpoint and not the channel as a whole. This principle is essential because compositional media control allows the features to connect one endpoint to many other endpoints, in an unrestricted and unpredictable way. The principle ensures that the same descriptor can be used to connect an endpoint to any other endpoint. With these rules, there is no guarantee that the two directions of a media channel will be using the same codec.

The "addrAndCodecs" field of an endpoint descriptor in a signal must agree with the descriptor of the channel that this signal is contributing to. The codecs must be data formats for the medium in the descriptor. If the channel is one-way, then the "addrAndCodecs" field of the sending endpoint should have the distinguished value "noAddr", although no harm is done if it does not.

The "flow" tag is used only for temporary muting of an established media channel. Its default value is true. If its current value for an endpoint is false, then media should not be sent to that endpoint until its value is "true" again. If the application requires it, a box can mute the media flow controlled by a flowlink. It mutes by calling the flowlink method "linkMute", and unmutes by calling the flowlink method "linkUnmute". The direction argument specifies the direction of flow to be muted or unmuted. The methods set at least one "utd" flag to "false", so the "match", method will be activated to send a new endpoint descriptor if possible. For example, the "flow" flag in the endpoint descriptor will be "false" if the flow is currently muted, and the value stored with the relevant chanterm otherwise.

This algorithm is compositional because any box in the signaling path can set the flag to "false"; it is "true" only if it is true at the endpoint and at all the boxes in the path. This algorithm also allows changes in endpoint addresses while media flow is muted; move signals pass through the flowlink with only their flow values changed.

Figure 11:
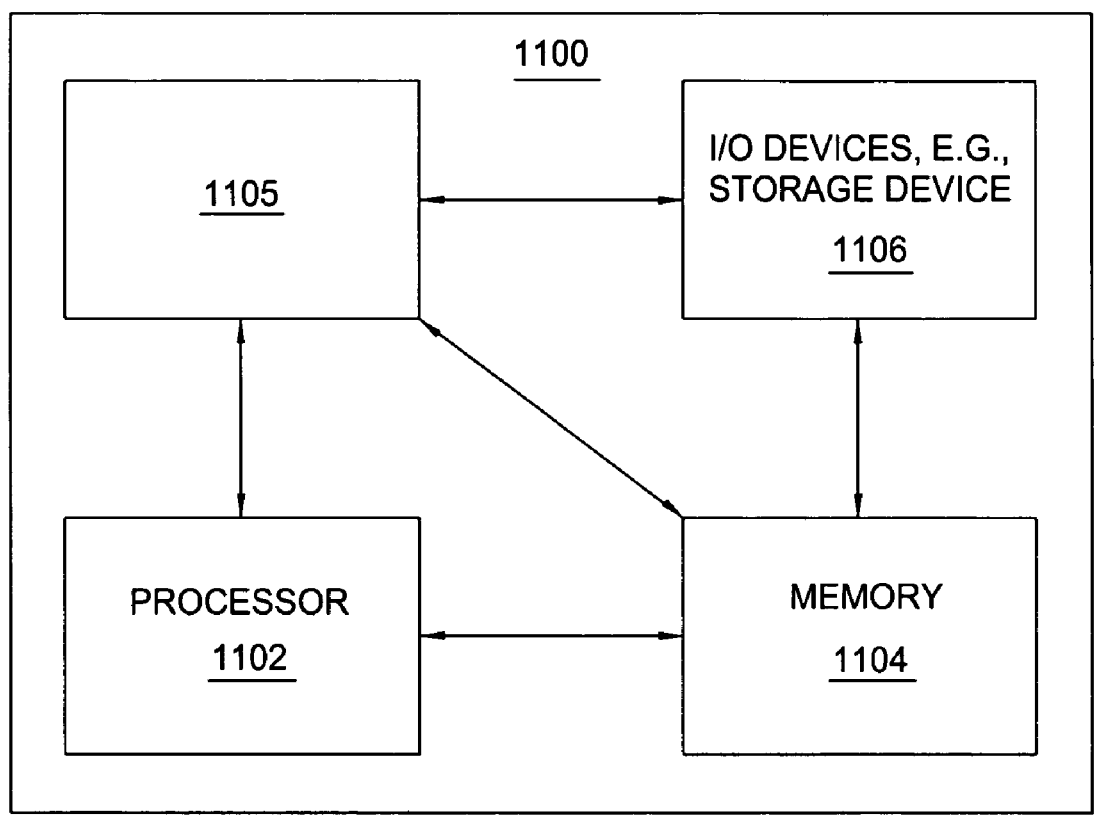
FIG. 11 illustrates a high-level block diagram of a general-purpose computer suitable for use in performing the functions described herein.

FIG. 11 depicts a high-level block diagram of a general-purpose computer suitable for use in performing the functions described herein. As depicted in FIG. 11, the system 1100 comprises a processor element 1102 (e.g., a CPU), a memory 1104, e.g., random access memory (RAM) and/or read only memory (ROM), a module 1105 for providing compositional control of end-to-end media for services on IP networks, and various input/output devices 1106 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, alarm interfaces, power relays and the like)).

It should be noted that the present invention can be implemented in software and/or in a combination of software and hardware, e.g., using application specific integrated circuits (ASIC), a general-purpose computer or any other hardware equivalents. In one embodiment, the present module or process 1105 for providing compositional control of end-to-end media for services on IP networks can be loaded into memory 1104 and executed by processor 1102 to implement the functions as discussed above. As such, the present method 1105 for providing compositional control of end-to-end media for services on IP networks (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

APPENDIX A

```
Protocol for an initiating endpoint:
  proctype initiator (chan out, in)   {
  begin:    out!open;
  opening:  do
                  ::  in?oack;      goto flowing
                  ::  in?close;     out!closeack; goto end
                  ::  out!close;    goto closing
                  od;
  flowing:  do
                  ::  in?move;      out!moveack
                  ::  out!move;     goto moving
                  ::  in?close;     out!closeack; goto end
                  ::  out!close;    goto closing
                  od;
  moving:   do
                  ::  in?moveack;   goto flowing
                  ::  in?move;      out!moveack
                  ::  in?close;     out!closeack; goto end
                  ::  out!close;    goto closing
                  od;
  closing:  do
                  ::  in?oack
                  ::  in?move
                  ::  in?moveack
                  ::  in?closeack;  goto end
                  ::  in?close;     out!closeack
                  od;
  end:      skip
  }
Protocol for an accepting endpoint:
  proctype acceptor (chan out, in) {
  begin:    in?open;
  opened:   do
                  ::  out!oack;     goto flowing
                  ::  in?close;     out!closeack; goto end
                  ::  out!close;    goto closing
                  od;
  flowing:  do...
  }
```

APPENDIX B

```
Protocol for a channel termination
  public class ChanTerm    {
  private int tunnel, state, mediaAddr;
  ChanTerm    (int tunnelArg)
  {   tunnel = tunnelArg; }
  public int termState ( )   {
  //   guarantee state initialized
       return state;
  }
  public int termAddr ( )   {
  //   guarantee mediaAddr initialized
       return mediaAddr;
  }
  public int termReceive   (Signal signal)   {
  switch (signal.typeOfSig( ) )   {
  case OPEN:
     state = OPENED;
     mediaAddr = signal.addrOfSig( );
     break;
  case OACK:
     if    (state = = CLOSING)    break;
     state = FLOWING;
     mediaAddr = signal.addrOfSig( );
     break;
  case MOVE:
     if    (state = = CLOSING) break;
     mediaAddr = signal.addrOfSig( )
     if    (state= =OUTMOVING)   state = BOTHMOVING;
     else state = INMOVING;
     break;
  case MOVEACK:
     if    (state = = CLOSING) break;
     if    (state = = BOTHMOVING) state = INMOVING;
     else state = FLOWING;
```

APPENDIX B-continued

```
      break;
   case CLOSE:
      sendSignal (new Signal(CLOSEACK, tunnel));
      if  (state ! = CLOSING)   state = CLOSED;
      break;
   case CLOSEACK:
      state = CLOSED;   break;
   }
   return state;
}
public int termSend (Signal signal)  {
switch (signal.typeOfSig( ) )  {
case OPEN:
   sendSignal(Signal.tunOverride(tunnel) );
   state = OPENING;
   break;
case OACK:
   sendSignal (signal.tunOverride(tunnel) );
   state = FLOWING;
   break;
case MOVE:
   sendSignal(signal.tunOverride(tunnel) );
   if   (state= =INMOVING) state = BOTHMOVING;
   else state = OUTMOVING;
   break;
case MOVEACK:
   sendSignal   (signal.tunOverride(tunnel) );
   if   (state= =BOTHMOVING)    state = OUTMOVING;
   else state = FLOWING;
   break;
case CLOSE:
   if   (state ! = CLOSING)     {
      sendSignal (signal.tunOverride(tunnel) );
      state = CLOSING;
   }
   break;
}
return state;
}
private void sendSignal (Signal signal) {
   <send signal out in its tunnel>;
   }
}
```

APPENDIX C

The Object Hierarchy

Figure 12:
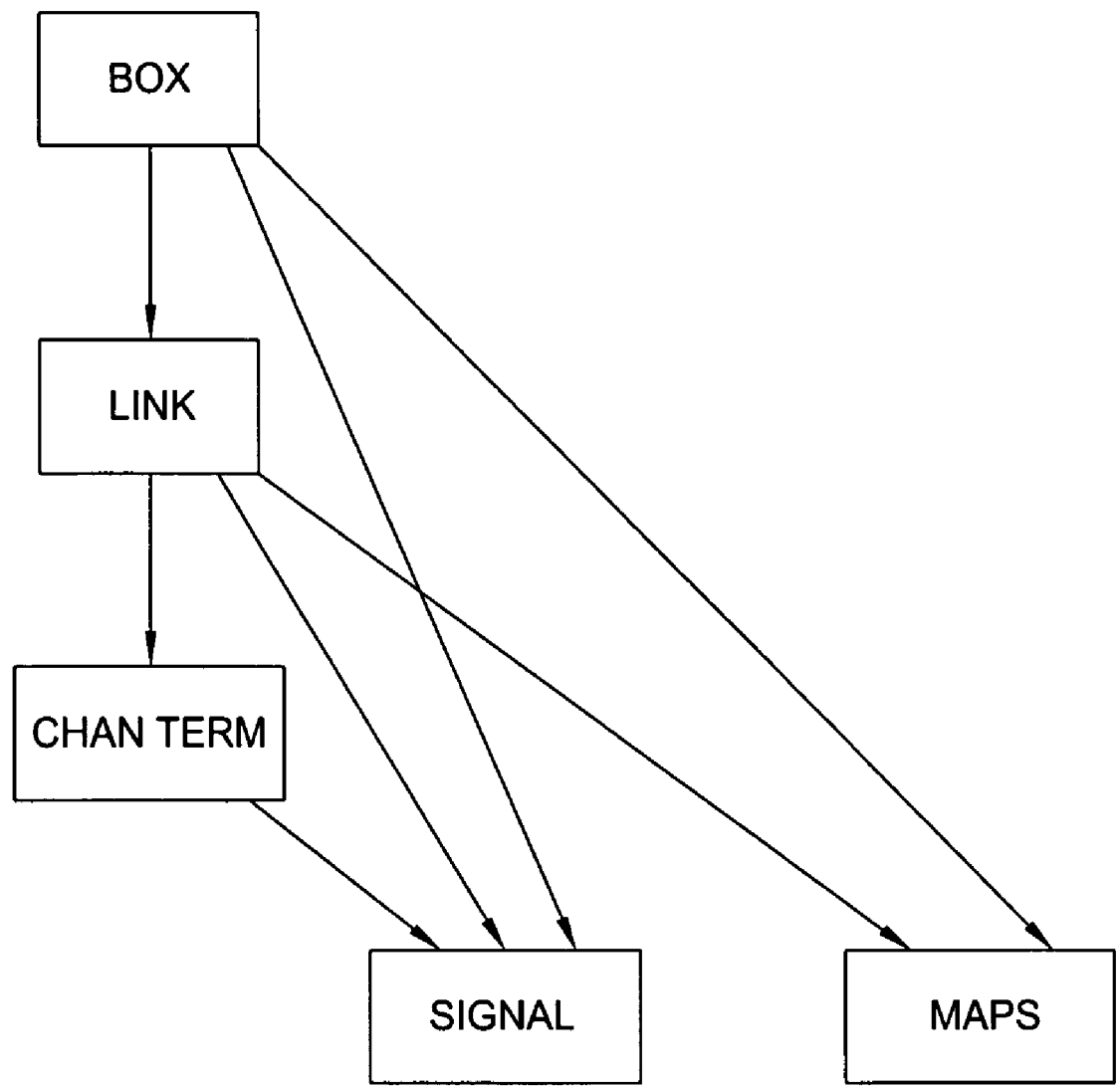
FIG. 12 shows a method-invocation hierarchy among the Java classes used to implement the invention.

FIG. 12 shows the method-invocation hierarchy among the Java classes used to implement the invention.

The code for objects of type Signal, which are protocol signals is provided first for simplicity. The remaining base classes are explained later and the codes for each object type are provided. Each signal has at least a type and a tunnel:

```
public class Signal    {
private int type,   tunnel;
Signal (int typeArg, int tunnelArg){
   type = typeArg;
   tunnel = tunnelArg;
}
public Signal tunOverride (int newTunnel)   {
   int oldType = this.typeOfSig( );
   return new Signal (oldType, newTunnel);
}
public int typeOfSig ( )   {   return type; }
public int tunOfSig ( )   {   return tunnel;}
public int addrOfSig ( )   {    return NOADDR; }
}
```

The method tunOverride creates, from an old signal, a new signal with a different tunnel. It is used in the process of copying a signal from one tunnel to another.

Signal of type open, oack, and move are in the subclass MoveSignal because they contain media addresses:

```
public class MoveSignal extends Signal {
private int mediaAddr;
MoveSignal
(int typeArg, int tunnelArg, int addrArg) {
   super(typeArg, tunnelArg);
   mediaAddr = addrArg;
}
public int addrOfSig ( )
{   return mediaAddr;     }
public Signal tunOverride (int newTunnel)    {
   int oldType = this.typeOfSig( );
   int oldAddr = this.addrOfSig( );
   return new MoveSignal
      (olfType, newTunnel, oldAddr);
}
}
```

The class Signal can also be extended further to add additional fields to signals.

For the Maps object within each box, there is a highly dynamic relationship among slots, links, tunnels, and chanterms. The relationship is both accessed and changed by both the box library and links. There is a single Maps object for each box, encapsulating this relationship. The box and all its links have pointers to it, so it is shared global storage for the box.

Throughout the code, "S" is an abbreviation for "slot", "L" for "link", "T" for "tunnel", and "C" for "chanterm". A maps object contains explicit one-way object maps for four of the possible pairings:

```
public class Maps    {
   private Map SLmap = new HashMap ( );
   private Map STmap = new HashMap ( );
   private Map TSmap = new HashMap ( );
   private Map TCmap = new HashMap ( );
```

For example, SLmap is the map from slots to links. These maps are closely related; for example, STmap and TSmap are inverses of each other. The proper invariants are preserved by these methods, which perform all updates:

```
public void fillLink    (Link link,    int slot)
{    SLmap.put(new Integer(slot),link);    }
public void vacateLink    (int slot)    {
   SLmap.remove(new Integer (slot));
}
public void fillSlotAndTunnel
(int slot,    int tunnel,    ChanTerm    term) {
   Integer s= new Integer(slot);
   Integer t = new Integer (tunnel);
   STmap.put(s, t);
   TSmap.put(t, s);
   TCmap.put(t, term);
}
public void vacateSlotandTunnel (int slot)    {
   Integer s = new Integer(slot);
   Integer t = (Integer)STmap.get(s);
   STmap.remove(s);
   TSmap.remove(t);
   TCmap.remove(t);
}
```

A link is filled with one or more slots, and vacated when a slot is taken away. A slot is filled with a tunnel, and vacated when the tunnel is taken away. A tunnel is filled with a chanterm, and vacated when the chanterm is taken away. Note that a corresponding slot and tunnel are always vacated simultaneously, while they can be filled simultaneously or separately. There are also methods for retrieving information from the Maps object.

```
public Link getSLmap        (int slot)   {
    return
            (Link) SLmap.get(new Integer(slot));
}
public int getSTMap (int slot)   {
    Integer t =
            (Integer)STmap.get(new Interger(slot));
    if   (t = = null)   return NOTUNNEL;
        else return t.intValue ( );
}
public int getTSmap (int tunnel)   {
    Integer s =
            (Integer)TSmap.get(new Integer(tunnel));
    if   (s = = null) return NOSLOT;
        else return s.intValue( );
}
public ChanTerm get TCmap     (int tunnel)   {
    return
            (ChanTerm) TCmap.get(new Integer(tunnel));
}
```

There is also a need for a link-to-slot map, which is the inverse of SLmap. It is not kept in the Maps object, however, because it is accessed only by links, a link only needs to know its own slots, and the slots of a link do not change throughout the life of the link. For this reason, each link can store its own slots. In effect, the link-to-slot map is distributed over the link objects. In exactly the same way, the chanterm-to-tunnel map is distributed over the chanterm objects. Finally, the Maps object provides a unique tunnel whenever it is needed for an initiating chanterm. The method here uses pseudocode, as the actual details depend on the particular rules chosen to ensure tunnel uniqueness.

```
private int nextTun = <box intial value>;
public int newInitiator ( )  {
    nextTun = <new value>;
    return nextTun;
    // rely this.getTSmap(nextTun) = = NOSLOT
    }
}
```

Throughout the invention, code comments present assertions that should be true at the control points where they are written. A rely assertion is an assumption, that is, an assertion that the code relies on but cannot itself guarantee. A guarantee assertion is one that the code itself guarantees, provided•that all the rely assertions are true. The postcondition on new Initiator is a rely•assertion because it relies on the implementation of the pseudocode new value which is not given in this invention.

The Box object actually consists of a library of methods used by the box programmer to control media. These methods were introduced earlier. This Appendix gives details on how they are implemented and how they must be used. Each Box object has a Maps object. The first collection of methods manipulates the assignment of slots to links:

```
public class Box  {
private Maps maps = new Maps ( );
public void enterHoldLink (int slot)           {
    //   rely maps.getSLmap (slot) = = null
        Link link = new HoldLink (slot, maps);
        maps.fillLink(link,slot);
}
public void enterOpenLink (int slot)           {
    //   rely maps.getSLmap(slot) = = null
        Link link = new OpenLink(slot,maps);
        maps.fillLink(link,slot);
}
public void enterCloseLink (int slot)          {
    //   rely maps.getSLmap(slot) = = null
        Link link = new CloseLink(slot,maps);
        maps.fillLink(link,slot);
}
public void enterFlowLink
(int slot1, int slot2, boolean matchNow)       {
    //   rely maps.getSLmap(slot1) = = null
    //   rely maps.getSLmap(slot2) = = null
        Link link = new
                FlowLink(slot1, slot2, matchNow, maps);
        maps.fillLink(link, slot1);
        maps.fillLink(link, slot2);
}
public void exitLink(int slot){
        maps.vacateLink(slot);
}
```

Each enter . . . Link method creates a new link with one or two slots. A pointer to the Maps object is passed to the link so that the link can: access it. An enter . . . Link method also updates the Maps object. The matchNow argument to enterFlowLink is usually true; the exceptional case when it is false is discussed in later in flowlinks description.

All of the enter . . . Link•methods rely on preconditions that the slot (or slots) they are assigning to a link is not already assigned to a link. These preconditions preserve the invariant that a slot can belong to at most one link at a time.

The method exitLink takes a slot out of a link. If the link is a flowlink, this method must be applied atomically to both of its slots. After this there will be no references to the link object remaining, and it becomes garbage.

On reading an open signal from one of its input queues, the box chooses a vacant slot for it, and calls the handleOpenSignal method with the signal and the slot. The method fills the slot with the tunnel of the signal, and then calls the linkReceive method in the link to handle the signal. Note also that between reading the open and calling this method, the box might call other methods above to re-arrange its slots and links.

```
public void handleOpenSignal
(Signal signal, int slot) {
    //   rely maps.getSLmap(slot) ! = null
    //   rely maps.getSTmap(slot) = = NOTUNNEL
    //   rely signal ! = null
    //   rely maps.getTSmap (signal.tunOfSig( ) )
    //         = = NOSLOT
        Link link = maps.getSLmap(slot);
    //   guarantee link ! = null
        link.linkReceive(slot, signal);
}
```

The handleOpenSignal method relies on four assertions. The box programmer is responsible for guaranteeing the preconditions that the slot is assigned to a link, that the slot is vacant (not filled with a tunnel), and that the signal is a real object. The condition that the tunnel is not already filling a slot is the responsibility of the architecture, which must ensure that tunnels are unique identifiers of accepting chanterms within boxes.

Finally, on reading any media signal that is not an open, the box calls this method.

```
public void handleMediaSignal
    (Signal signal)      {
//    rely signal ! = null
      int tunnel = signal.tunOfSig( );
//    guarantee maps.getTSmap(tunnel) ! = NOSLOT
      int slot = maps.getTSmap(tunnel);
//    rely maps.getSLmap(slot) ! = null
      Link link = maps.getSLmap(slot);
//    guarantee link ! = null
      link.linkReceive(slot,signal);
    }
}
```

This code shows why it is necessary to have a mapping from tunnels to slots. After the open signal of a chanterm has been received, the only identification in subsequent incoming signals of the chanterm is their tunnel. It must be possible to determine from a signal's tunnel the slot and link to which it belongs.

This code relies on the programmer to ensure that the slot has a link, which he/she can do by exercising the following caution in programming. While a slot is filled, it is fine to move it from one link to another. However, the code that moves it, namely:

```
            box.exitLink(slot);
            box.enter...Link(slot);
``` must be atomic in the sense that it cannot be interrupted by receipt of any media signal.

The guarantee that the tunnel has a slot is based on a proof that no object calls vacateSlotAndTunnel before the tunnel is truly idle and cannot receive another signal.

For channel terminations, there is a ChanTerm object for each channel termination. The object performs several functions.

One function is to keep track of the state of the chanterm. It can do this because it receives every incoming signal of the chanterm through the method termReceive, and every outgoing signal of the chanterm through the method termSend. Note that a chanterm has no defined state until it has received or sent an open signal.

A Chanterm object must keep track of the state of the chanterm because a chanterm can be passed from link to link throughout its life. The Chanterm object provides persistent storage for the chanterm. Each new link initializes itself by querying the Chanterm object through termState to find out what its state is. There is a guarantee that the state is always initialized when termState is called.

Another function of the Chanterm object is that the termSend method actually sends signals out the tunnel of the chanterm. It does this by calling sendSignal which is pseudocode here.

The final function of the Chanterm object is to generate closeack signals whenever the protocol requires it. This means that the Link objects need no logic to deal with closeacks.

```
public class ChanTerm       {
private int tunnel, state, mediaAddr;
ChanTerm   (int tunnelArg)
{      tunnel = tunnelArg; }
public int termState ( )     {
//    guarantee state initialized
      return state;
}
public int termAddr ( )      {
//    guarantee mediaAddr initialized
      return mediaAddr;
}
public int termReceive       (Signal signal)       {
switch (signal.typeOfSig( ) )      {
case OPEN:
      state = OPENED;
      mediaAddr = signal.addrOfSig( );
      break;
case OACK:
      if    (state = = CLOSING)       break;
      state = FLOWING;
      mediaAddr = signal.addrOfSig( );
      break;
case MOVE:
      if    (state = = CLOSING) break;
      mediaAddr = signal.addrOfSig( )
      if    (state= =OUTMOVING)    state = BOTHMOVING;
      else state = INMOVING;
      break;
case MOVEACK:
      if    (state = = CLOSING) break;
      if    (state = = BOTHMOVING) state = INMOVING;
      else state = FLOWING;
      break;
case CLOSE:
      sendSignal (new Signal(CLOSEACK, tunnel));
      if    (state ! = CLOSING)      state = CLOSED;
      break;
case CLOSEACK:
      state = CLOSED; break;
}
return state;
}
public int termSend (Signal signal)      {
switch (signal.typeOfSig( ) )      {
case OPEN:
      sendSignal(Signal.tunOverride(tunnel) );
      state = OPENING;
      break;
case OACK:
      sendSignal (signal.tunOverride(tunnel) );
      state = FLOWING;
      break;
case MOVE:
      sendSignal(signal.tunOverride(tunnel) );
      if    (state= =INMOVING) state = BOTHMOVING;
      else    state = OUTMOVING;
      break;
case MOVEACK:
      sendSignal (signal.tunOverride(tunnel) );
      if    (state= =BOTHMOVING) state = OUTMOVING;
      else state = FLOWING;
      break;
case CLOSE:
      if    (state ! = CLOSING) {
            sendSignal (signal.tunOverride(tunnel) );
            state = CLOSING;
      }
      break;
}
return state;
}
private void sendSignal   (Signal signal)      {
      <send signal out in its tunnel>;
}
}
```

For Link objects each Link object keeps track of the state of each of its slots while the slot is under its control. The states of a slot are the same as the states of a chanterm, with the exception that only a chanterm has a closed state, while only a slot has a vacant state. The four link types are explained below:

CloseLink is called to initialize a CloseLink object, and linkReceive is called whenever a chanterm it is controlling receives a signal. CloseLink begins by initializing four local variables concerning the slot it is controlling: slot, tunnel, term, and state. The purpose of a closelink is to close any chanterm that might be occupying the link. If the slot is occupied by a chanterm in a state that can send a close signal, the closelink generates and sends it. The code for a closeLink object is shown below:

```
public class CloseLink extends Link  { private Maps maps;
                                       private in slot, tunnel, state;
               private ChanTerm term;
CloseLink(int slotArg,    Maps mapsArg){
     slot   = slotArg;
     maps  = mapsArg;
     tunnel =maps.getSTmap(slot);
     if   (tunnel  = =  NOTUNNEL) state = VACANT;     else   {
        term   =  maps.getTCmap(tunnel);    // guarantee term ! = null
        state  =   term.termState( ) ;   }
     if   (state ! = VACANT && state ! = CLOSING)
        state = term.termSend(new Signal (CLOSE,0) );
}              // guarantee     (state = = VACANT ||state = = CLOSING)
public void linkReceive (int slotArg, Signal signal)   {
     int type   =  signal.typeOfSig( );
     if (type  = =OPEN) {
        tunnel = signal.tunOFSig( );
        term  = new ChanTerm (tunnel) ;
        maps.fillSlotAndTunnel (slot, tunnel, term) ; } // guarantee
        term ! = null
     state = term.termReceive (signal);
        if    (state = = CLOSED)    {
           state = VACANT;
           tunnel = NOTUNNEL; term = null;
           maps.vacateSlotAndTunnel (slot) ;    }
        if    (state ! = VACANT && state ! = CLOSING)
           state = term.termSend (new Signal (CLOSE,0) ) ;
}                // guarantee     (state = = VACANT ||state = = CLOSING)
}
```

The linkReceive method begins by updating its local variables. Note that slotArg is not used; it is present because it is needed by flowlinks, and all links have the same interface.

The main thing the link must do to update its own state is to convey the new signal to its chanterm through termReceive, and get back the updated state of the chanterm. There are two complications, however. If the received signal is an open, the link must first create the chanterm. Also, if the returned state of the chanterm is closed, the link must vacate the slot. Finally, if the slot is occupied by a chanterm in a state that can send a close signal, the closelink generates and sends it.

The OpenLink object like the CloseLink object, it has an initialization method and a linkReceive method. The code for the OpenLink object is shown below:

```
Implementation of an OpenLink Object
public class OpenLink extends Link       { private Maps maps;
                                           private  int slot, state, tunnel ;
                                           private  ChanTerm term;
                                           private  boolean openAndHeld = false;
OpenLink (intslotArg, Maps mapsArg) {
     slot   = slotArg;
     maps  = mapsArg;
     tunnel = maps.getSTmap (slot);
     if   (tunnel = = NOTUNNEL) state  =   VACANT; else   {
        term = maps.getTCmap(tunnel);            // guarantee term ! = null
        state = term.termState ( ); }
     if   (state = = INMOVING ||state = = BOTHMOVING)
     // the obligation to acknowledge was created by a former link
        state = term.termSend (new Signal(MOVEACK, 0) );
     attemptToOpenAndHold ( );
}
              // guarantee    (state = = OPENING ||state = = FLOWING ||
              //                 state = =OUTMOVING||state = = CLOSING)
public void linkReceive (intslotArg, Signal signal)    {
     int type = signal.typeOfSig( ); guarantee type != OPEN, guarantee term != null
     state = term.termReceive (signal);
     if    (type==MOVE && state !=CLOSING)state=term.termSend(newSignal(MOVEACK,0));
//   if   (type     == MOVEACK && !openAndHeld)    it is a response to a move sent by other link
//   if   (type    ==MOVEACK && openAndHeld),     response to a move generated by this link
     if   (state    = =CLOSED {
        state     = VACANT;
        tunnel   = NOTUNNEL; term   =  null;
        maps.vacateSlotAndTunnel  (slot);
        openAndHeld  =  false; }
     if    (!openAndHeld) attemptToOpenAndHold( );
}              // guarantee (state == OPENING ||state == FLOWING||
               //              state ==OUTMOVING||state ==CLOSING
     private   void    attemptToOpenAndHold    ( ) {
     // guarantee    (state != INMOVING && state !+ BOTHMOVING)
        if    (state = =VACANT)   {
           tunnel = maps.newInitiator( );
           term  = new ChanTerm (tunnel);
           maps.fillSlotAndTunnel(slot, tunnel, term);
           state  = term.termSend (new MoveSignal (Open, 0, NOADDR) );
           openAndHeld  = true;    }
```

```
        else  if  (state = =OPENED)   {
            state  =  term.termSend (newMoveSignal (OACK, 0, NOADDR) );
            openAndHeld = true;   }
        else  if  (state = =FLOWING)   {
            state  =  term.termSend (new MoveSignal (MOVE, 0, NOADDR) );
            openAndHeld  =  true;   }
    }
}
```

The initialization of state at the beginning of the OpenLink method is exactly the same as in CloseLink. The updating of state in the linkReceive method of the OpenLink object is similar to that in the CloseLink object. Because an OpenLink object maintains a chanterm in an active state, it must be concerned with moveack signals. During initialization, if the chanterm is obligated to send a moveack signal, the link generates it. This is necessary because the obligation was created by a former link. The former link no longer exists, so there is no other way that the obligation can be discharged.

If the chanterm receives a move signal, the link immediately generates a moveack signal. This is like what happens at time t3 in FIG. 8. Note that the Chanterm object stores the new media address that arrives in the move signal. The goal of an openlink is to get its slot to a stable flowing state with mediaAddress equal to noAddr so that no media is being transmitted (in this state media is said to be held). The OpenLink method initially sets the variable openAndHeld to false, indicating that the goal has not yet been achieved.

The private method attemptToOpenAndHold is responsible for achieving the goal. If the slot is vacant, the method opens it. If the slot is not vacant, as soon as the state of the protocol allows it to, attemptToOpenAndHold generates and sends a signal updating the mediaAddress to noAddr.

Unlike the linkReceive method of CloseLink, the linkReceive method of OpenLink does not have code for receiving an open signal. This is because an openlink never allows its slot to remain vacant, so its slot can never be filled with an incoming open. Once filled, the slot can always become vacant. The variable openAndHeld is set to false again so that the link will once again fill the slot.

The code for the HoldLink code is very similar to the OpenLink code and it is provided below. The goal of a holdlink is just like the goal of an openlink, except that vacant is an acceptable slot state for a holdlink. Thus, unlike OpenLink, HoldLink does not set held to false when its slot becomes vacant. Also, the attemptToHold method of HoldLink does not send open if its slot is vacant. The reasons that the linkReceive method of OpenLink cannot receive an open signal do not apply to HoldLink. Like CloseLink, its linkReceive method allows this possibility.

```
Implementation of a HoldLink Object
Public class HoldLink extends Link   {   private Maps maps;
                                         private    int slot, state, tunnel;
                                         private    ChanTerm term;
                                         private    boolean held = =false;
    HoldLink (int slotArg, Maps mapsArg){
        slot      = slotArg;
        maps      = mapsArg;
        tunnel    = mpas.getSTmap (slot);
        if    (tunnel   = =NOTUNNEL) state = VACANT;   else   {
            term   =  maps.getTCmap (tunnel);          // guarantee term != null
            state = term.termState( );   }
        if   (state = = INMOVING ||state = = BOTHMOVING)
        // the obligation to acknowledge was created by a former link
            state = term.termSend (new Signal (MOVEACK, 0) );
        if    (state == VACANT ||state == CLOSING) held  =  true;    else attemptToHold( );
                          // guarantee   (state ==OPENING    ||state = =FLOWING||
                          // state== OUTMOVING   ||state == CLOSING    ||state ==VACANT)
    public void linkReceive (int slotArg, Signal signal) {
        int type = signal.typeOfSig( );
        if   (type = =OPEN)   {
            tunnel = signal.tunOfSig( );
            term = new ChanTerm (tunnel);
            maps.fillSlotAndTunnel (slot, tunnel, term);
            utd= false; }              // guarantee term != null
        state = term.termReceive (signal);
        if (type == MOVE&& state!= CLOSING) state= termtermSend(new Signal (MOVEACK,0));
//  if   ((type == MOVEACK) && !held) it is a response to a move sent by another link
//  if   (type == MOVEACK) && held)  it is a response to a holding move sent by this link
        if (state ==CLOSED)   {
            state  = VACANT;
            tunnel = NOTUNNEL; term  =  null;
            maps.vacateSlotAndTunnel(slot);
            held  = true  }
        if (!held) attemptToHold ( );
    }              // guarantee   (state = =OPENING ||state = =FLOWING ||
                   // state== OUTMOVING   ||state == CLOSING ||state ==  VACANT)
```

-continued

```
private void attemptToHold ( ) {   // guarantee (state == OPENED  ||state == OPENING||
                                      state == FLOWING ||state = =OUTMOVING)
    if (state = =OPENED)    {
        state = term.termSend   (new MoveSignal (OACK, 0, NOADDR) );
        held  = true;    }
    else if (state = =FLOWING)   {
        state = term.termSend   (new MoveSignal    (MOVE, 0, NOADDR) );
        held  = true;    }
}
}
```

By far the most complex link is the FlowLink. The initialization code in FlowLink, and the update code in linkReceive, are similar to those in other links, except that there are two slots instead of one to manage. The codes for FlowLink object are provided below.

Implementation of a FlowLink Object: Initialization

```
public class FlowLink extends Link {   private Maps maps;
                                       private intslot1, slot2, state1, state2,
                                              tun1, tun2;
                                       private    ChanTerm term1, term2;
                                       private boolean utd1, utd2; //"up to date"
                                       private boolean aba1, aba2; //"absorb (move)ack"
FlowLink (intslotArg1, int slotArg2, boolean matchNow,Maps mapsArg){
    slot1 = slotArg1; slot2 = slotArg2;
    maps = mapsArg;
    tun1 = maps.getSTmap(slot1);
    if (tun1 = =NOTUNNEL)state1 = VACANT; else {
        term1 = maps.getTCmap(tun1);         // guarantee   term1 != null
        state1 = term1.termState( ); }
    tun2 = maps.getSTmap (slot2);
    if (tun2 = =NOTUNNEL) state2 VACANT; else {
        term2 = maps.getTCmap(tun2);         // guarantee   term2 != null
        state2 = term2.termState ( ); }
    if (state1 = =INMOVING ||state1 = =BOTHMOVING)
    // the obligation to acknowledge was created by a former link
        state1 = term1.termSend (new Signal(MOVEACK, 0) );
    if (state2 = =INMOVING ||state2 = =BOTHMOVING)
    // the obligation to acknowledge was created by a former link
        state2 = term2.termSend (new Signal(MOVEACK,0) );
    utd1 = false; utd2 = false;
    if (state1 = =OUTMOVING) aba1 = true; else aba1 = false;
    if (state2 = =OUTMOVING) aba2 = true; else aba2 = false;
    if (matchNow) match ( );
}
```

Implementation of a FlowLink Object: Receiving a Signal

```
public void linkReceive ( int    slotArg ,    Signal signal ) {
    int type   = signal . typeOfSig ( ) ;
    if ( slotArg == slot1 ) {
        if ( type == OPEN ) {
            tun1  = signal . tunOfSig ( );
            term1 = new ChanTerm ( tun1) ;
            maps . fillSlotAndTunnel (slot1 , tun 1 , term 1 ) ;
            utd2 = false ; }                      // guarantee    term1 != null
        state1 = term1 . termReceive (signal) ;
        if (type   == OACK|| type == MOVE)   utd2 = false ;
        if (type   == MOVEACK && ! aba1 && state2 != VACANT
            state2 = term2 . termSend (signal) ;
        if (type   == CLOSE && state1 != CLOSING   &&state2 != VACANT
            state2 term2 . termSend (new Signal (CLOSE , )) ;
        if (state1   == CLOSED){
            state1 = VACANT ;
            tun1  = NOTUNNEL ;   term1 = null ;
            maps . vacateSlotAndTunnel (slot1) ;}
    }
    else {           // guarantee slotArg    == slot2
        if (type   == OPEN) {
            tun2 = signal . tunOfSig ( ) ;
```

```
        term2 = new chanterm (tun2) ;
        maps . fillSlotAndTunnel (slot2, tun2, term2) ;
        utd1   = false ; }            // guarantee    term2 != null
    state2 = term2 . termReceive (signal) ;
    if (type    == OACK|| type == MOVE) utd1 = false ;
    if (type    == MOVEACK && ! aba2 && state1 ! = VACANT)
        state1 = term1 . termSend (signal) ;
    if (type    == CLOSE    && state2 ! = CLOSING    && state state1 != VACANT)
        state1 = term1 . termSend (new Signal (CLOSE , 0 )) ;
    if (state2    == CLOSED){
        state2 = VACANT;
        tun2  = NOTUNNEL ;    term2 = null ;
        maps . vacateSlotAndTunnel (slot2) ;}
    }
    match ( ) ;
}
```

Implementation of a FlowLink Object: State Matching

```
private void match ( ) {
    if ( ! utd1) {
        if (state2    == VACANT || state2 == CLOSING)   utd= true;
        else if (described(state2)) {
            tun1   = maps . newInitiator ( ) ;
            term1 = new ChanTerm (tun1) ;
            maps . fillSlotAndTunnel (slot1 , tun1 , term1) ;
            state1 = term1 . termSend (new MoveSignal (OPEN , 0 , term2 . termAddr (
0 ))) ;
            utd= true ;
            if (state2   == INMOVING || state2 == BOTHMOVING)
                state2 = term2 . termSend (new Signal (MOVEACK , 0)) ; }
        }
        else if (state1   == OPENED)  {
            if (described (state2))  {
                state1 = term1 . termSend (new MoveSignal (OACK , 0 , term2 .
termAddr ( ))) ;
                utd1 = true ; }
        }
        else if (state1   == FLOWING || state1 == INMOVING) {
            if (described (state2)) {
                state1 = term1 . termSend (new MoveSignal (MOVE , 0 , ter2 . termAddr
( ))) ;
                ava1 = false ; else aba1 = true ;
                utd1 = true ; }
        }
    }
    if ( ! utd2) {
        if (state2    == VACANT){
        else if (described (state1)) {
            tun2   = maps . newInitiator ( )
            term2 = new ChanTerm (tun2) ;
            maps . fillSlotAndTunnel (slot2 , tun2 , term2) ;
            state2 = term2 . termSend (new MoveSignal (OPEN , 0 , term1 . termAddr (
))) ;
            utd= true ;
            if (state1   == INMOVING || state1 == BOTHMOVING)
                state1 = term1 . termSend 9new Signal (MOVEACK , 0 )) ; }
        }
        else if (state2 == OPENED) {
            if (described (state1)) {
                state2 = term2 . termSend (new MoveSignal (OACK , 0 , term1 .
termAddr ( ))) ;
                utd= true ;    }
        }
        else if (state2 == FLOWING || state2 == INMOVING) {
            if (described(state1)) {
                state2 = term2 . termSend (new MoveSignal (OACK , 0 ,term , termAddr
( ))) ;
                if (state1   == INMOVING || state1 == BOTHMOVING)
                    aba2 = false ; else aba2 = true ;
                utd2 = true ; }
        }
    }
} }
```

The goal of a flowlink is to match the states of its slots. They should both tend to vacant or both tend to flowing, depending on the actions of the box's environment. If both are flowing, each chanterm should have received as its send address the address of the other chanterm (using the terminology of FIG. 8).

Each slot has a variable utd that is true if and only if the slot is up-to-date with respect to both state and media address. The FlowLink method initializes both variables to false, because at initialization, the states of the slots can only be up-to-date (matched) by accident. The linkReceive method sets the utd variable of a slot to false if the other slot receives an open, oack, or move signal, because any of these might create a need for an update.

The purpose of the match method is to make the utd variables true. The most interesting concept in the match method is that of a described state, defined as follows:

```
private boolean described (int state) {
    if  (state = = OPENED || state = = FLOWING  ||
        state = = INMOVING ||
        state = = OUTMOVING ||
        state = = BOTHMOVING) return true;
    else return false;
}
```

When a slot is in a described state, the far end of the chanterm has produced a media address describing the endpoint it represents. This media address can be sent to the other chanterm in an open, oack, or move signal, depending on the protocol state of the other chanterm.

If a slot is not yet in a described state, the other slot cannot yet be brought up-to-date, because the necessary information is not available. In this case a call to match may have no effect. Eventually, however, the link will receive the necessary signal, linkReceive will update the slot state, and then linkReceive will call match again. At this point match will be able to take action and bring the other slot up to date.

The propagation of a close signal from one slot to the other is handled by the linkReceive method rather than by the match method. If a close signal arrives when•its chanterm is already closing, it is superfluous and is not propagated.

A flowlink needs careful handling of moveack signals. First, like holdlinks and openlinks, its initialization method generates moveack signals to cancel obsolete obligations.

A flowlink needs to absorb some moveack signals it receives from a slot, and to propagate other moveack signals to the other slot. The cases are distinguished using the two boolean aba variables, which stands for "absorb (move)ack". The linkReceive method propagates a moveack signal to the other slot only if the aba variable of the receiving slot is false. If absorb (move)ack" of the slot is true; then the signal is absorbed.

Initially, an aba variable is true only if its corresponding slot is outmoving. Some previous link sent a move signal through this chanterm. If a corresponding moveack is received it must be absorbed, as there is no appropriate place to send it.

In all other cases, the flowlink receives a moveack because its match method sent a move. The aba flag governing the moveack is set at the time that the move is sent. If this move is being sent because the other slot received a move, which can be determined from the state of the other slot, then aba is set to false. In all other cases the moveack should be absorbed, so aba is set to true.

Finally we come to the matchNow argument of enterFlowLink. This is used only in a special situation in which the box has a filled slot and a newly received open signal. If the program logic requires the box to fill another slot with the newly opened chanterm and put the two slots together in a flowlink, then the program must read as follows:

```
box.enterFlowLink
    (filledSlot, vacantSlot, false);
box.handleOpenSignal (openSignal, vacantSlot);
```

This will initialize the flowlink without calling match, fill the vacant slot, then call match. It is important that a call to enterFlowLink with matchNow==false always be followed immediately by handleOpenSignal in this way.

Without matchNow==false, the FlowLink method would call the match method, which would proceed to fill the vacant slot by sending an open signal. Then the call of handleOpenSignal would not be valid because its argument slot would not be vacant.

It is not possible to solve the problem by calling handleOpenSignal before enterFlowLink because that violates the precondition handleOpenSignal that its slot already has a link.

What is claimed is:

1. A method for providing a compositional control of at least one media channel in a communication network, comprising:

controlling said at least one media channel between two different endpoints by a plurality of feature boxes, wherein each of said plurality of feature boxes provides a different feature on said at least one media channel and where each of said plurality of feature boxes comprises an autonomous module having a program module that modifies or enhances a basic communication service and said plurality of feature boxes are located within said communication network and between said two different endpoints; and originating a request or a response to a request on behalf of at least one endpoint by one of said plurality of feature boxes.

2. The method of claim 1, wherein said communication network is a Voice over Internet Protocol (VoIP) network or a Service over Internet Protocol (SoIP) network.

3. The method of claim 1, wherein said at least one media channel is a bi-directional media channel, and where each direction of said bi-directional media channel is controlled independently.

4. The method of claim 1, wherein said request comprises at least one of: an open request, a move request, or a close request.

5. The method of claim 1, wherein said response to said request comprises at least one of: an open acknowledgement, a move acknowledgement, or a close acknowledgement.

6. The method of claim 1, wherein each of said plurality of feature boxes and said at least one endpoint is representative of a channel termination for a signaling channel.

7. The method of claim 6, wherein each of said channel termination is capable of initiating or accepting said request.

8. The method of claim 7, wherein each of said channel termination is incapable of initiating and accepting said request at the same time.

9. The method of claim 6, wherein each of said channel termination is in one of: an opened state, an opening state, a flowing state, an inmoving state, an outmoving state, a bothmoving state, a closing state or a closed state.

10. The method of claim 1,
wherein said at least one media channel comprises a plurality of media channels; and
wherein each of said plurality of feature boxes has an ability to control said plurality of media channels to said at least one endpoint.

11. A computer-readable medium having stored thereon a plurality of instructions, the plurality of instructions including instructions which, when executed by a processor, cause the processor to perform the steps of a method for providing a compositional control of at least one media channel in a communication network, comprising:
controlling said at least one media channel between two different endpoints by a plurality of feature boxes, wherein each of said plurality of feature boxes provides a different feature on said at least one media channel and where each of said plurality of feature boxes comprises an autonomous module having a program module that modifies or enhances a basic communication service and said plurality of feature boxes are located within said communication network and between said two different endpoints; and
originating a request or a response to a request on behalf of at least one endpoint by one of said plurality of feature boxes.

12. The computer-readable medium of claim 11, wherein said communication network is a Voice over Internet Protocol (VoIP) network or a Service over Internet Protocol (SoIP) network.

13. The computer-readable medium of claim 11, wherein said at least one media channel is a bi-directional media channel, and where each direction of said bi-directional media channel is controlled independently.

14. The computer-readable medium of claim 11, wherein said request comprises at least one of: an open request, a move request, or a close request.

15. The computer-readable medium of claim 11, wherein said response to said request comprises at least one of: an open acknowledgement, a move acknowledgement, or a close acknowledgement.

16. The computer-readable medium of claim 11, wherein each of said plurality of feature boxes and said at least one endpoint is representative of a channel termination for a signaling channel.

17. The computer-readable medium of claim 16, wherein each of said channel termination is capable of initiating or accepting said request.

18. The computer-readable medium of claim 17, wherein each of said channel termination is incapable of initiating and accepting said request at the same time.

19. The computer-readable medium of claim 16, wherein each of said channel termination is in one of: an opened state, an opening state, a flowing state, an inmoving state, an outmoving state, a bothmoving state, a closing state or a closed state.

20. An apparatus for providing a compositional control of at least one media channel in a communication network, comprising:
means for controlling said at least one media channel between two different endpoints by a plurality of feature boxes, wherein each of said plurality of feature boxes provides a different feature on said at least one media channel and where each of said plurality of feature boxes comprises an autonomous module having a program module that modifies or enhances a basic communication service and said plurality of feature boxes are located within said communication network and between said two different endpoints; and
means for originating a request or a response to a request on behalf of at least one endpoint by one of said plurality of feature boxes.

* * * * *